(12) United States Patent
Calhoun et al.

(10) Patent No.: US 10,170,990 B2
(45) Date of Patent: *Jan. 1, 2019

(54) METHODS AND APPARATUS FOR A SINGLE INDUCTOR MULTIPLE OUTPUT (SIMO) DC-DC CONVERTER CIRCUIT

(71) Applicant: UNIVERSITY OF VIRGINIA PATENT FOUNDATION, Charlottesville, VA (US)

(72) Inventors: Benton H Calhoun, Charlottesville, VA (US); Aatmesh Shrivastava, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,745

(22) Filed: Jul. 3, 2017

(65) Prior Publication Data
US 2017/0366086 A1 Dec. 21, 2017

Related U.S. Application Data

(63) Continuation of application No. 14/213,215, filed on Mar. 14, 2014, now Pat. No. 9,698,685.

(Continued)

(51) Int. Cl.
*H02M 3/158* (2006.01)
*H02M 1/00* (2006.01)

(52) U.S. Cl.
CPC ...... *H02M 3/158* (2013.01); *H02M 2001/009* (2013.01); *Y10T 307/406* (2015.04)

(58) Field of Classification Search
CPC ........ H02J 1/00; H02M 3/158; Y10T 307/406
See application file for complete search history.

(56) References Cited

U.S. PATENT DOCUMENTS 6,075,295 A 6/2000 Li
6,927,619 B1 8/2005 Doyle
(Continued)

FOREIGN PATENT DOCUMENTS

| JP | 2845206 | 1/1999 |
|---|---|---|
| JP | 2013-9516 A | 1/2013 |
| WO | WO 2011/140218 | 11/2011 |

OTHER PUBLICATIONS

Office Action dated Jul. 26, 2017, issued in counterpart Chinese Application No. 201480015411.6, with English translation (9 pages).

(Continued)

*Primary Examiner* — Robert Deberadinis
(74) *Attorney, Agent, or Firm* — Weaver Austin Villeneuve & Sampson LLP

(57) ABSTRACT

In some embodiments, an apparatus includes a single-inductor multiple-output (SIMO) direct current (DC-DC) converter circuit, with the SIMO DC-DC converter circuit having a set of output nodes. The apparatus also includes a panoptic dynamic voltage scaling (PDVS) circuit operatively coupled to the SIMO DC-DC converter circuit, where the PDVS circuit has a set of operational blocks with each operational block from the set of operational blocks drawing power from one supply voltage rail from a set of supply voltage rails. Additionally, each output node from the set of output nodes is uniquely associated with a supply voltage rail from the set of supply voltage rails.

19 Claims, 25 Drawing Sheets

200

Related U.S. Application Data

(60) Provisional application No. 61/783,121, filed on Mar. 14, 2013.

(56) References Cited

U.S. PATENT DOCUMENTS

| | | | |
|---|---|---|---|
| 7,224,085 | B2 | 5/2007 | Chen et al. |
| 7,256,568 | B2 | 8/2007 | Lam et al. |
| 7,432,614 | B2 | 10/2008 | Ma et al. |
| 8,049,472 | B2 | 11/2011 | Easwaran et al. |
| 8,154,218 | B2 | 4/2012 | Kuang et al. |
| 9,698,685 | B2 * | 7/2017 | Calhoun ............ H02M 3/158 |
| 2004/0201281 | A1 | 10/2004 | Ma et al. |
| 2008/0231115 | A1 | 9/2008 | Cho et al. |
| 2010/0026267 | A1 | 2/2010 | Easwaran et al. |
| 2010/0045110 | A1 | 2/2010 | Liu et al. |
| 2010/0097045 | A1 | 4/2010 | Chen |
| 2010/0231186 | A1 | 9/2010 | Chen et al. |
| 2010/0283322 | A1 | 11/2010 | Wibben |
| 2011/0068757 | A1 | 3/2011 | Xu et al. |
| 2011/0187189 | A1 | 8/2011 | Moussaoui et al. |
| 2012/0286576 | A1 | 11/2012 | Jing et al. |
| 2014/0285014 | A1 | 9/2014 | Calhoun et al. |

OTHER PUBLICATIONS

Office Action dated Jul. 10, 2017, issued in counterpart Korean Application No. 10-2015-7029136, with English translation (13 pages).

Office Action dated Jul. 11, 2017, issued in counterpart Japanese Application No. 2016-502791, with English translation (7 pages).

Office Action dated Oct. 24, 2017, issued in counterpart Japanese Application No. 2016-502791, with English translation (6 pages).

Office Action dated Nov. 14, 2017, issued in counterpart Korean Application No. 10-2015-7029136, with partial translation (3 pages).

Shrivastava et al., "Modeling DC-DC Converter Efficiency and Power Management in Ultra Low Power System", Subthreshold Microelectronics Conference, 2012, (20 pages).

Partial Supplementary European Search Report dated Mar. 14, 2017, issued in counterpart European Application No. 14769088.7. (9 pages).

Hanh-Phuc, Le, Master's Thesis, "Single Inductor Multiple Output (SIMO) DC-DC Converter for Portable Applications," [http://www.eecs.berkeley.edu/-phucle/Thesis/KAIST _20044359_Phuc_M.S.Thesis%202006.pdf].

Leung, et al., "High-efficiency SIMO Power Converter for Soc (ITS/445/09)", [http://www2.eecuhk.edu.hk/-ntho/rfidtag/ TS_445_09].

Chen, et al., "A SIMO Parallel-String Driver IC for Dimmable LED Backlighting With Local Bus Voltage Optimization and Single Time-Shared Regulation Loop," IEEE Transactions on Power Electronics, vol. 27, No. 1, Jan. 2012.

Ma, Dongsheng, "Integrated Single-Inductor Multiple Output and Adaptive DC-DC Conversion for Efficient Power Management," A Dissertation, Jul. 2003, Hong Kong.

Belloni, et al., "Single-Inductor Multiple-Output DC-DC Conductors," [http://ims.unipy.it/FIRB2006/pub/Belloni09.pdf].

Lin, et al., "Family of Single-Inductor Multi-Output DC-DC Converters," PEDS 2009.

Bayer, et al., "A Single-Inductor Multiple-Output Converter with Peak Current State-Machine Control," IEEE Applied 7 Power Electronics Cont., and Expo., Mar. 2006, p. 7.

Le, et al., "A Single-Inductor Switching DC-DC Converter With Five Outputs and Ordered Power-Distributive Control," IEEE Journal of Solid-Slate Circuits, vol. 42, No. 12, Dec. 2007.

B.H. Calhoun and A. Chandrakasan, "Ultra-Dynamic Voltage Scaling (UDVS) Using Sub-threshold Operation and Local Voltage Dithering," IEEE Journal of Solid-Slate Circuits, vol. 41, No. 1, pp. 238-245, Jan. 2006.

L. Di, M. Putic, J_ Lach, and B. H. Calhoun, "Power Switch Characterization for Fine-Grained Dynamic Voltage Scaling," International Conference on Computer Design, pp. 605-611, Oct. 2008.

M. Putic, L. Di, B. H. Calhoun, and J_ Lach, "Panoptic DVS: A Fine-Grained Dynamic Voltage Scaling Framework for Energy Scalable CMOS Design," International Conference on Computer Design (ICCD), 2009.

Y. Ramadass and A. Chandrakasan, 'Voltage Scalable Switched Capacitor DC-DC Converter for Ultra-Low-Power on chip Applications,' PESC, pp. 2353-2359, 2007.

Y Ramadass and A. Chandrakasan, Minimum Energy Tracking Loop with Embedded DC-DC Converter Enabling Ultra-Low-Voltage Operation Down to 250mV in 65nm CMOS, JSSC, vol. 43, No. 1, pp. 256-265, Jan. 10, 2008.

F. Zhang, Y. Zhang, J_ Silver, Y. Shakhsheer, M. Nagaraju, A. Klinefelter, J_ Pandey, J_ Boley, E. Carlson, A. Shrivastava, B. Olis, and B. H. Calhoun, "A Battery-less 19µW MICS/ISM-Band Energy Harvesting Body Area SensorNode SoC," ISSCC, 2012.

Y. Shakhsheer, S. Khanna, K. Craig, S. Arrabi, J_ Lach, and B. H. Calhoun, "A 90nm data flow processor demonstrating fine grained DVS for energy efficient operation from 0.25V to 1.2V," CICC 2011.

C.W. Kuan, and H. C. Lin, "Near-independently regulated 5-output single-inductor DC-DC buck converter delivering 1.2W/mm2 in 65nm CMOS," ISSCC 2012.

M. H. Huang, and K. H. Chen, "Single-Inductor Multi-Output (SIMO) DC-DC Converters With High Light-Load Efficiency and Minimized Cross-Regulation for Portable Devices," JSSC, vol. 44, No. 4, Apr. 2009.

Y Ramadass, A. Fayed, and A. Chandrakasan, "A Fully-Integrated Switched-Capacitor Step-Down DC-DC Converter with Digital Capacitance Modulation in 45 nm CMOS," JSSC, vol. 45, No. 12, Dec. 2010.

Japanese Office Action (Notification of Reasons for Refusal) dated Nov. 1, 2016 in corresponding Japanese Application No. 2016-502791. With English Translation.

Putic et al., "Panoptic DVS: A Fine-Grained Dynamic Voltage Scaling Framework for Energy Scalable CMOS Design", In Computer Design, 2009, ICCD 2009, IEEE International Conference, Oct. 4-7, 2009. Retrieved from the Internet: URL: http://ieeexplore.ieee.org/xpl/login.jsp?tp=&arnumber=5413110&uri=http%3A%2F%2Fieeexplore.ieee.org%2Fxpls%2Fabs_all.jsp%3Farnumber%3D5413110; abstract, p. 1, paragraphs 1-3, p. 2, paragraphs 1, 2, figures 2-4, p. 3, paragraphs 3-5, p. 4, table 1, paragraph 5, Cited in ISR (8 pages).

Notification of Transmittal of the International Search Report and the Written Opinion of the International Searching Authority, or The Declaration (Forms PCT/ISA/220) issued in counterpart International Application No. PCT/US/28442 dated Oct. 6, 2014 with Forms PCT/ISA/210 and PCT/ISA/237 (18 pages).

Chinese Office Action dated Jan. 2, 2018 in corresponding CN Application No. 201480015411.6. With No Translation.

Chinese Office Action dated Jun. 6, 2018 in corresponding CN Application No. 201480015411.6. With English Translation.

European Search Report dated Jun. 14, 2017, issued in counterpart European Application No. 14769088.7. (9 pages).

International Preliminary Report on Patentability and the Written Opinion of the International Searching Authority issued in counterpart International Application No. PCT/US2014/028442 dated Sep. 15, 2015.

U.S. Office Action dated Jun. 15, 2016 in corresponding U.S. Appl. No. 14/213,215.

U.S. Notice of Allowance dated Mar. 2, 2017 in corresponding U.S. Appl. No. 14/213,215.

\* cited by examiner

400A

400B

700

METHODS AND APPARATUS FOR A SINGLE INDUCTOR MULTIPLE OUTPUT (SIMO) DC-DC CONVERTER CIRCUIT

CROSS-REFERENCE TO RELATED PATENT APPLICATIONS

This application is a continuation of U.S. application Ser. No. 14/213,215, filed Mar. 14, 2014 entitled "Methods and Apparatus for Single Inductor Multiple Output (SIMO) DC-DC Converter Circuit," which claims priority to and the benefit of U.S. Provisional Application No. 61/783,121, filed Mar. 14, 2013 entitled "Multiple Output Regulator Circuit," which applications are each incorporated herein by reference in their entireties.

BACKGROUND

Some embodiments described herein relate generally to systems and methods for minimizing power consumption in integrated circuits (ICs) in embedded systems.

Embedded systems can be used in a variety of applications including, for example, providing monitoring, sensing, control, or security functions. Such embedded systems are generally tailored to specific applications, according to relatively severe constraints on size, power consumption, or environmental survivability.

In particular, one class of embedded system can include sensor nodes, such as sensor nodes for sensing or monitoring one or more physiologic parameters. Sensor nodes are implemented as ICs and can provide significant benefit to health care providers, such as enabling continuous monitoring, actuation, and logging of physiologic information, facilitating automated or remote follow-up, or providing one or more alerts in the presence of deteriorating physiologic status. The physiologic information obtained using such a sensor node can be transferred to other systems that can be used to help diagnose, prevent, and respond to various illnesses such as diabetes, asthma, cardiac conditions, or other illnesses or conditions.

A sensor node can provide particular value to a subject or care giver if the sensor node includes certain features such as, for example, long-term monitoring capability and/or wearability. A long lifetime for a sensor node without maintenance, replacement, or manual recharging becomes ever more important as health care costs escalate or as more care providers attempt to transition to remote patient follow-up and telemedicine. It is believed that generally-available sensor nodes are precluded from widespread adoption because of a lack of extended operational capability or wearability.

Minimizing or reducing power consumption by employing power management techniques is desirable in integrated circuit (IC) design. Known techniques for minimizing or reducing power consumption such as, for example, dynamic voltage scaling (DVS), where the power supply of an IC is modulated according to its performance needs, has several drawbacks in practical implementation such as the output capacitor ($C_L$) of the DC-DC converter is typically large that leads to large settling time. Additionally, the energy stored in a capacitor is typically also high and thus changing the output voltage involves energy overheads. Typically such overheads limits the rate at which the $V_{DD}$ can be scaled and hence the amount of energy that can be saved.

Other known methods such as, for example, panoptic dynamic voltage scaling (PDVS) include drawbacks such as the use of at least three DC-DC converters, different routing devices, switches and level-converters that are used to implement the PDVS technology. Such a large number of components involve the use of high circuit area and high costs for implementation.

Accordingly, a need exists for apparatus and methods for implementing energy efficient and cost efficient methods to minimize power consumption by ICs used in embedded systems.

SUMMARY

Figure 1:
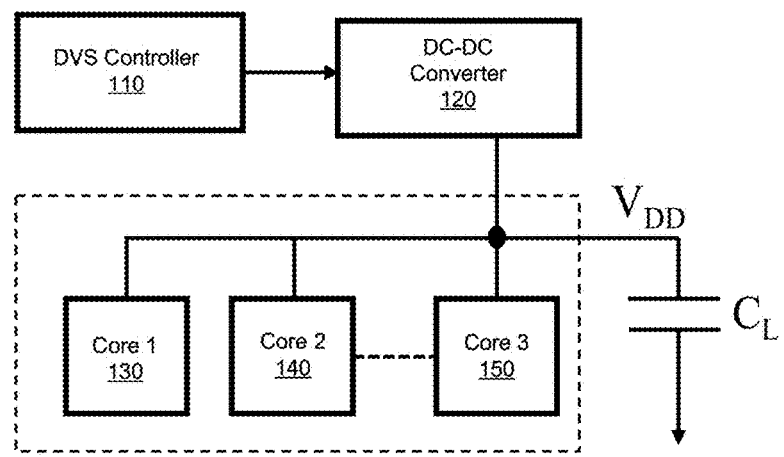
FIG. 1 is a schematic illustration of a known dynamic voltage scaling (DVS) circuit for a multi-core system.

In some embodiments, an apparatus includes a single-inductor multiple-output (SIMO) direct current (DC-DC) converter circuit, with the SIMO DC-DC converter circuit having a set of output nodes. The apparatus also includes a panoptic dynamic voltage scaling (PDVS) circuit operatively coupled to the SIMO DC-DC converter circuit, where the PDVS circuit has a set of operational blocks with each operational block from the set of operational blocks drawing power from one supply voltage rail from a set of supply voltage rails. Additionally, each output node from the set of output nodes is uniquely associated with a supply voltage rail from the set of supply voltage rails.

DETAILED DESCRIPTION

In some embodiments, an apparatus includes a single-inductor multiple-output (SIMO) direct current (DC-DC) converter circuit, with the SIMO DC-DC converter circuit having a set of output nodes. The apparatus also includes a panoptic dynamic voltage scaling (PDVS) circuit operatively coupled to the SIMO DC-DC converter circuit, where the PDVS circuit has a set of operational blocks with each operational block from the set of operational blocks drawing power from one supply voltage rail from a set of supply voltage rails. Additionally, each output node from the set of output nodes is uniquely associated with a supply voltage rail from the set of supply voltage rails.

In some embodiments, an apparatus includes a single-inductor multiple-output (SIMO) DC-DC converter circuit having a set of output nodes, a set of comparators, and a set of switches operatively coupled to the set of comparators. The set of comparators and the set of switches collectively define a hysteretic-based output to control a set of output nodes, where each comparator from the set of comparators is uniquely associated with an output node from the set of output nodes, and each output node from the set of output nodes is uniquely associated with a circuit block from a set of circuit blocks.

In some embodiments, an apparatus includes a single-inductor multiple-output (SIMO) converter circuit, where the SIMO converter circuit includes a set of output nodes and an inductor, and a set of circuit blocks, where each circuit block from the set of circuit blocks is coupled to the set of output nodes. The SIMO converter circuit can operate over a set of time periods, where the SIMO converter circuit can prioritize a single output node from the set of output nodes for each time period from the set of time periods such that the prioritized single output node receives current from the inductor before the remaining output nodes.

In some embodiments, an apparatus includes an embedded system that includes a voltage converter circuit that includes a first switch that can couple a first input node to a first terminal of an inductor in response to a control signal provided to a control input of the first switch. The apparatus also includes a first comparator circuit, a second comparator circuit, a diode coupled between a second input node and the first switch that is coupled to the first terminal of the inductor, and a controller circuit that can selectively couple one of the output of the first comparator or the output of the second comparator to the control input of the switch based on a specified output regulation priority. The controller circuit can also selectively couple a second terminal of the inductor to one of a first output node or a second output node based on the specified output regulation priority.

As used in this specification, the singular forms "a," "an" and "the" include plural referents unless the context clearly dictates otherwise. Thus, for example, the term "a comparator" is intended to mean a single comparator or a combination of comparators.

An embedded system, such as a sensor node, can use multiple power supply domains or output voltages. Such a system can include a power supply circuit configured to provide power for various functional blocks included as a portion of the system. The power supply circuit outputs can be adjusted or selected, and operably coupled to respective functional blocks of the system based on information about a state of an energy source.

For example, when available energy is abundant, a functional block can be supplied by a power supply voltage adjusted or selected to provide enhanced processing performance. Similarly, when available energy is limited, the functional block can be supplied by a power supply voltage adjusted or selected to conserve energy, perhaps at a cost of decreased processing performance. In one approach, a dynamic voltage scaling (DVS) technique can be used, such as to dither or select between available power supply voltages in real-time based on one or more of processing demand or the state of the energy source. DVS, however, involves several overheads as described above.

FIG. 1 is a schematic illustration of a known dynamic voltage scaling (DVS) circuit for a multi-core system. In FIG. 1, the DVS is for a single $V_{DD}$, multi-core system 100 that includes a first core 130, a second core 140 and a third core 150. The $V_{DD}$ is scaled according to the performance or power needs of the IC. The DVS controller 110 modulates the power supply of the IC according to its performance needs. The implementation of the DVS system shown in FIG. 1 involves several overheads. The output capacitor ($C_L$) of a DC-DC converter 120 is usually large; therefore it has large settling time. The energy stored on the capacitor ($C_L$) is also high; therefore changing the output voltage involves energy overheads. Usually these overheads limits the rate at which $V_{DD}$ can be scaled and hence the amount of energy that can be saved. The flexibility of DVS is also limited as individual cores 130-150 do not operate at their optimal voltages. Operating each core 130 or 140 or 150 with its own $V_{DD}$ can save more power. The number of DC-DC converters 120 used for this purpose, however, increases linearly with the number of cores 130-150. Low drop out (LDO) and switched capacitor converters present on-chip options for implementing DVS for multi-core systems, albeit at lower efficiency which again limits power savings. Panoptic dynamic voltage scaling (PDVS) is another technique that has been used to overcome the limitations of DVS.

Figure 2:
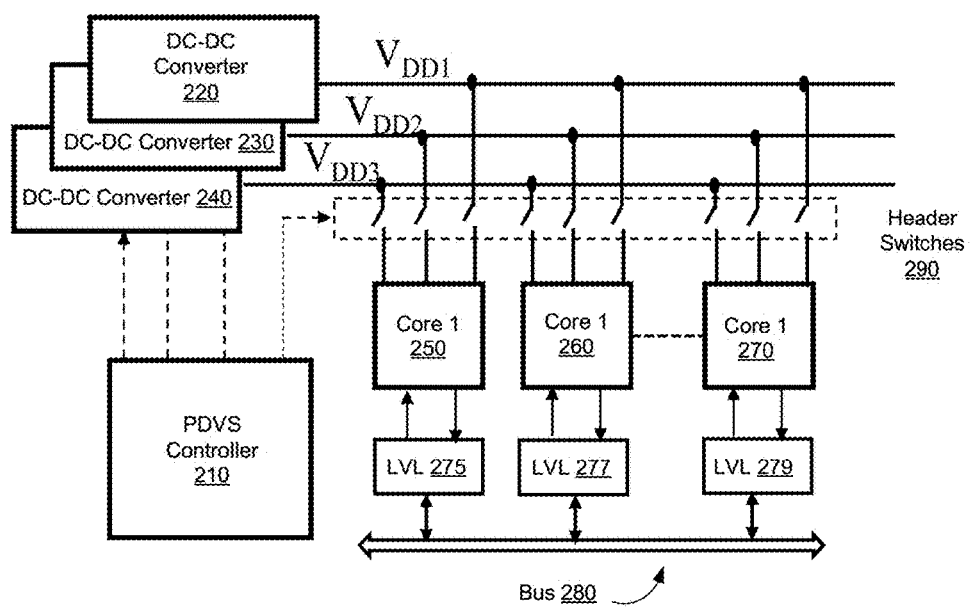
FIG. 2 is a schematic illustration of a known panoptic dynamic voltage scaling (PDVS) circuit for a multi-core system.

FIG. 2 is a schematic illustration of a known panoptic dynamic voltage scaling (PDVS) circuit for a multi-core system. The multicore system 200 includes a first core (or block) 250, a second core (or block) 260, and a third core (or block) 270. Each core 250-270 inside the multi-core system 200 can be connected to any of the three different $V_{DD}$ or voltage rails through header-switches 290. The cores or blocks 250-270 can be connected to a given $V_{DD}$ rail depending on power or performance requirements of the IC, and each $V_{DD}$ rail is supplied with voltage from their respective DC-DC converters 220-240. The PDVS controller 210 provides voltage (or current) to the appropriate DC-DC converters 220-240 as per the performance of the multi-core system 200. This allows the cores 250-270 to switch from one voltage to another. Using three different voltage levels, a block or core 250-270 can be made to operate at its substantially optimal voltage by using a voltage dithering technique. Using PDVS techniques, several limitations of known DVS circuits can be overcome. In a PDVS circuit, each block can be theoretically made to operate at its substantially optimal voltage, which results in higher overall power savings. The voltage rails in a PDVS circuit are fixed and the cores (or blocks) 250-270 are connected to these rails depending on their throughput demands. The fixed voltage level in a PDVS circuit eliminates or reduces the settling time and energy overhead costs usually present in known DVS techniques because of the overhead cost of the DC-DC converter. As a result, a PDVS circuit can implement a faster rate voltage scaling technique and can save more power. The implementation of a PDVS circuit, however, involves multiple DC-DC converters 220-240, where each DC-DC converter 220-240 feeds or supplies each $V_{DD}$ line. The other cost involved is higher area owing to the routing, switches and level-converters (LVL) 275-279 used in the PDVS circuit. The LVL's 275-279 are operably coupled to each other via the system bus 280. The area overhead of the switches 290, and the LVLs 275-279 is less than 15% for each core (or block), which does not amount to significant cost given the energy benefit. The cost of multiple DC-DC converters 220-240, however, used to implement the PDVS circuit can amount to significant cost when compared to a system implementing a single $V_{DD}$ DVS circuit as shown in FIG. 1.

In an embedded system, functional blocks can be included as a portion of one or more semiconductor devices having a high degree of integration. For example, one or more of a memory circuit, a general-purpose processor circuit, or an application-specific processor circuit can be included on a commonly-shared integrated circuit. Such an integrated circuit can be referred to as a "System-on-a-Chip" or SoC. It is now accepted that among other things, ultra-low power (ULP) techniques can be applied to one or more circuits included in an embedded system, such as a sensor node. For example, a SoC can include one or more analog or digital portions configured for sub-threshold operation, such as to conserve energy. Other techniques can be used instead of sub-threshold operation, or in addition to sub-threshold operation, such as power or clock gating to disable or suspend operation of specified sections of the system, or including adjusting a duty cycle, a clock frequency (e.g., clock throttling), or a supply parameter (e.g., supply voltage throttling) so as to reduce power consumption.

In one approach, respective power supply voltages (e.g., respective supply $V_{DD}$ "rails") can be provided by separate power supply regulation circuits. For example, such respective power supply regulation circuits can include linear (e.g., dissipative) or switching topologies to convert energy provided by an energy source (e.g., a battery or an energy harvesting circuit) to a specified regulated output voltage.

In contrast, it is recognized, among other things, that separate power supply circuits can be replaced with few or even a single multi-output power supply regulation circuit. Such a multi-output approach can reduce a power supply circuit footprint, reduce a component count (particularly discrete components), and can enhance efficiency. For example, a single-inductor multi-output (SIMO) topology can provide multiple respective regulated output voltages, such as using a single inductor. Such a SIMO topology can be used, for example, to provide respective regulated output voltages to a ULP SoC, such as included as a portion of a sensor node. Such an ULP SoC can include functional blocks configured to operate using scalable or selectable power supply voltages based on processing demand or in response to information about available energy.

The three output rails for a PDVS circuit can be generated through a SIMO architecture, which is a lower cost and a high efficiency solution. To further reduce the cost and system volume, the capacitors can be integrated. The integration of capacitors can be possible, for example, when lower capacitances are used. Use of lower sized capacitances, however, typically increases the ripple on the power supply. To mitigate this problem, lower sized on-chip capacitances can be used. The ripple on the power supply can be reduced through a hysteretic control scheme described herein. Furthermore, the use of SIMO also can typically result in higher ripple and cross regulation issues because of the changes in loads on the different $V_{DD}$ rails. This issue can be addressed by designing the SIMO converter to be able to configure itself based on the load information that is available in a PDVS system as described herein.

The following describes the design of a SIMO DC-DC converter with on-chip capacitors, using the features of PDVS techniques. This design can provide a cost efficient, energy efficient way to implement block level DVS. Some embodiments described herein are practical implementations for PDVS and implement low cost and efficient PDVS.

The use of SIMO can reduce the cost of multiple DC-DC converter demands for such embodiments. Such embodiments can provide, for example, three output rails at, for example, 0.9V, 0.7V, and 0.4V, respectively, and with a peak efficiency of 86% with integrated capacitance.

Figure 3:
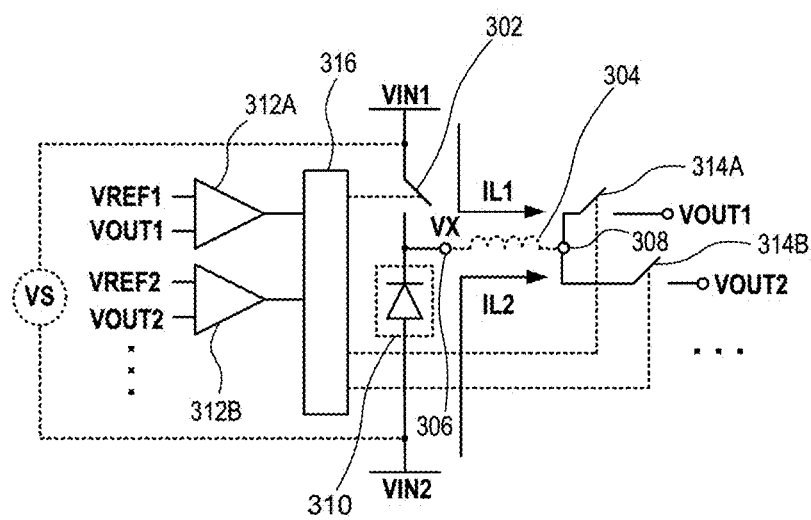
FIG. 3 is a schematic illustration of a single-inductor multiple-output (SIMO) converter circuit, according to an embodiment.

FIG. 3 is a schematic illustration of a single-inductor multiple-output (SIMO) converter circuit, according to an embodiment. The SIMO converter circuit 300 can be included as a portion of an integrated circuit, such as shown in the illustrative example of FIG. 24. In an example, the SIMO converter circuit 300 can include a first switch 302 that can controllably couple a first terminal 306 of an inductor 304 to a first input node VIN1. The SIMO converter circuit 300 can include a diode 310, such as coupled between the first terminal 306 of the inductor 304 and a second input node VIN2. A second terminal 308 of the inductor 304 can be controllably coupled to one of a first output node VOUT1, using a first output switch 314A, or a second output node VOUT2, using a second output switch 314B.

A control input of the switch 302 can be coupled to an output of a controller circuit 316. The SIMO converter circuit 300 can include a first comparator circuit 312A, such as including a first input coupled to the first output node VOUT1 (or a signal proportional to VOUT1), and a second input coupled to a first output node reference voltage VREF1. The first output node reference voltage VREF1 can be proportional to or correspond to a nominal or specified output voltage (e.g., a set point or target voltage for VOUT1). Similarly, the SIMO converter circuit 300 can include a second comparator circuit 312B, such as including a first input coupled to the second output node VOUT2 (or a signal proportional to VOUT2), and a second input coupled to the second reference voltage VREF2.

One or more of the first comparator circuit 312A or the second comparator circuit 312B can include a respective threshold specified at least in part to provide a specified respective hysteresis. For example, the hysteresis can be specified at least in part to limit a ripple of an output voltage provided at VOUT1 or VOUT2 by the SIMO converter 300.

The controller circuit 316 can selectively couple one of the output of the first comparator 312A or the output of the second comparator 312B to the control input of the switch 302, such as based on a specified output regulation priority. Similarly, the controller circuit 316 can include one or more respective outputs that can controllably couple one of the first output nodes VOUT1 or the second output node VOUT2 to the second terminal 308 of the inductor 304 based on a specified output regulation priority.

A voltage provided by the energy source VS can be boosted before coupling to one or more of the first or second input nodes VIN1 or VIN2. The SIMO converter circuit 300 can include a "buck" topology, such as to down-convert a voltage provided by the energy source VS, to provide respective regulated output voltages such as VOUT1 or VOUT2, or one or more other output voltages. For example, during a charging phase, a first inductor current IL1 can be established, such as using the first switch 302 in response to a control signal provided by the controller circuit 316. In an illustrative example, the inductor current can be linear assuming that the voltage provided at the first input node VIN1 is roughly constant. The diode 310 can be reverse-biased during such a charging phase. During a discharge phase, the first switch 302 can be opened, and the diode 310 can become forward biased as the voltage VX at first terminal 306 of the inductor 304 swings negative with respect to the second input node VIN2 (e.g., a ground or reference node), and a second inductor current IL2 can be established, through the diode 310. Although a diode 310 symbol is shown, the diode 310 can include one or more transistors, such as connected in a diode configuration or otherwise configured to provide a diode structure (e.g., such as provided by a field effect transistor (FET) in a cut-off mode of operation, or using a FET having a gate terminal shorted to a source terminal).

For purposes of illustration, FIG. 3 shows two comparators 112A and 112B, and corresponding two output nodes VOUT1 and VOUT2, respectively, as an example only and not a limitation. In other configurations, however, the topology shown in FIG. 3 can be structured to provide more than two comparators and their corresponding outputs. For example, as discussed in the examples below, the topology of FIG. 3 can be used to provide three or more outputs.

In the case of FIG. 3, the SIMO converter circuit 300 can be coupled to an energy source VS, such as a primary or rechargeable battery or an energy harvesting circuit. Examples of energy harvesting circuits include circuits configured to receive optical energy (e.g., a photovoltaic circuit), a thermoelectric generator (TEG), a circuit configured to harvest mechanical energy or vibration (e.g., a piezoelectric circuit), or a circuit configured to receive radiatively-coupled or magnetically-coupled operating energy (e.g., a radio-frequency receiver circuit).

In the case of FIG. 3, one or more of the first comparator circuit 312A, the second comparator circuit 312B, the controller circuit 316, the first switch 302, the diode 310, the first output switch 314A, the second output switch 314B, and one or more circuits to provide voltage references such as VREF1 or VREF2 can be included as a portion of a commonly-shared integrated circuit. In some instances, one or more of the inductor 304 and/or the energy source VS can be located off-chip.

Figure 4A:
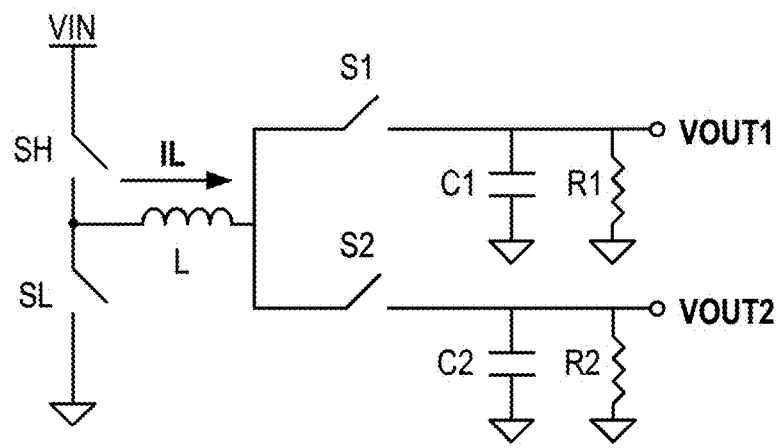
FIG. 4A is a schematic illustration showing a SIMO converter circuit having a high-side switch and a low-side switch, according to an embodiment.

FIG. 4A is a schematic illustration showing a SIMO converter circuit having a high-side switch and a low-side switch, according to an embodiment. In FIG. 4A, the high-side switch is represented as SH and the low-side switch is represented as SL. Additionally, in FIG. 4A, the SIMO converter circuit 400A can include an inductor L that can be coupled to one of a first output node VOUT1 via output switch S1, or a second output node VOUT2 via output switch S2. The inductor L can be used in a time-division-multiplexed (TDM) manner to provide regulated output voltages at the first and second output node VOUT1 and VOUT2. For example, VOUT1 can be coupled to a first decoupling capacitor C1 (e.g., one or more of an off-chip or an on-chip decoupling capacitor), and can include a first load resistance R1. Similarly, VOUT can be coupled to a second decoupling capacitor C2, and a first load resistance R2. Load resistances R1 and R2 can correspond to respective functional blocks, or the outputs VOUT1 and VOUT2 can be provided to a single functional block in a mutually-exclusive manner, such as to provide dynamic voltage scaling (DVS) as discussed in other examples herein.

Figure 4B:
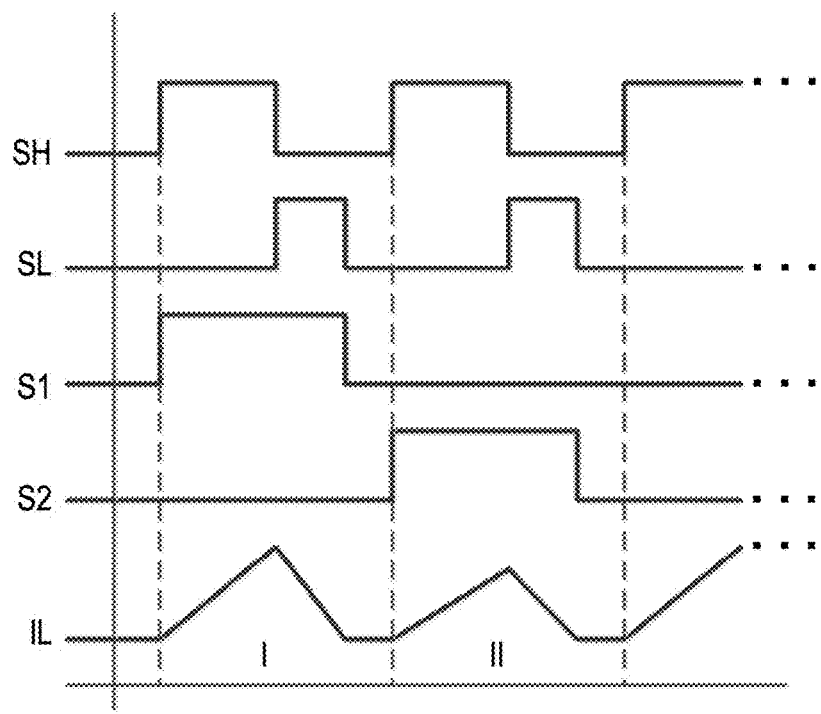
FIG. 4B is an illustration of a timing diagram that can include respective states of the switches shown in FIG. 4A.

FIG. 4B is an illustration of a timing diagram that can include respective states of the switches shown in FIG. 4A. Referring to FIGS. 4A and 4B, during the initial portion of phase I, the high-side switch SH can be closed and the first output switch S1 can be closed, such as to charge the inductor as seen in the IL curve. In the latter portion of phase I, the high-side switch SH can be opened, and the low-side switch SL can be closed, such as to discharge the inductor into the load (e.g., into capacitor C1 and load R1 in FIG. 4A) as seen by the IL curve. During phase II, the second output switch S2 is closed, and switches SH and SL are cycled in a manner similar to phase I. However, during phase II, the resulting inductor charge gets transferred to capacitor C2 and load R2 (as shown in FIG. 4A) as seen by the IL curve. During phase II, the output voltage VOUT1 is maintained by capacitor C1, and such an output voltage would generally not be expected to change significantly for a light load. Thus, the regulator circuit topology 400A of FIG. 4A is a suitable option for low power application because a single inductor can be multiplexed between multiple outputs, without causing significant voltage drops on any one of the outputs.

Figure 5:
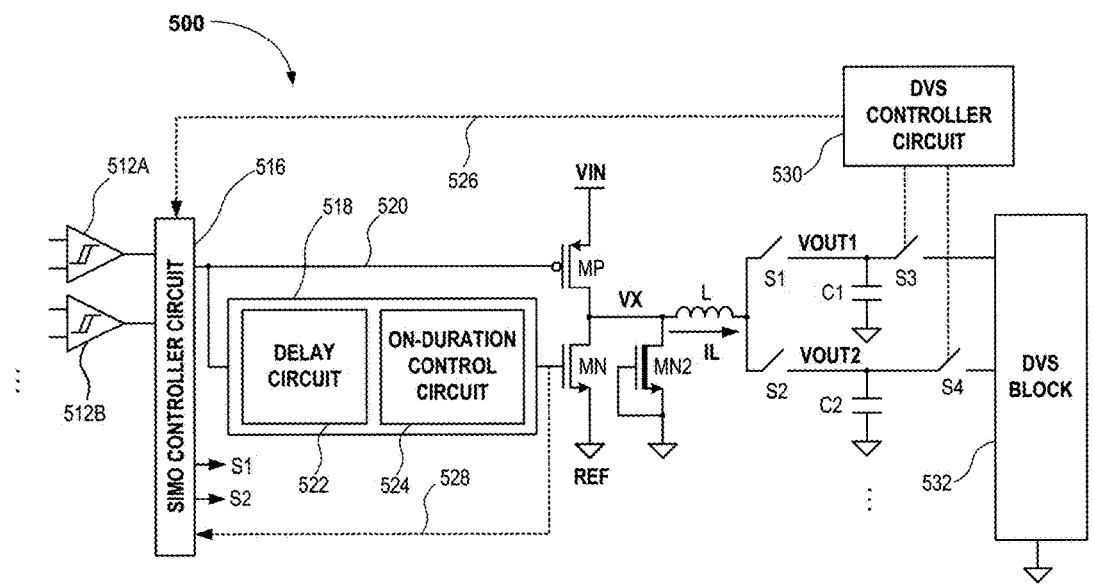
FIG. 5 is a schematic illustration of a SIMO converter circuit that can be coupled to a dynamic voltage scaling (DVS) functional block, according to an embodiment.

FIG. 5 is a schematic illustration of a SIMO controller circuit that can be coupled to a dynamic voltage scaling (DVS) functional block, according to an embodiment. As discussed in the examples of FIG. 3 and FIGS. 4A through 4B, a SIMO topology can be used to provide multiple regulated voltage outputs, such as using a single inductor L. In the example of FIG. 5, the high-side switch can include a p-channel transistor (MP), such as a metal-oxide-semiconductor field-effect transistor (MOSFET). Use of the phrase "metal-oxide-semiconductor" does not imply that the gate structure of such a FET must be metallic. Instead, a poly-crystalline silicon gate or other conductive material can be used for a gate electrode included as a portion of the FET structure.

In FIG. 5, the low-side switch can include an n-channel transistor (MN). A control input (e.g., a gate) of one or more of MP or MN can be coupled to an output 520 of a SIMO controller circuit 516. For example, the controller circuit output 520 can be shared between MP and MN, with a control input 528 to MN conditioned by a timer circuit 518. For example, the timer circuit 518 can include one or more programmable or fixed control circuits, such as a delay circuit 522 or an on-duration control circuit 524. The delay circuit 522 can provide a specified delay initiated after MP is turned off. Similarly, the on-duration of the low-side switch MN can be established by the on-duration control circuit 524, such as to provide a specified (e.g., fixed or adjustable) on-duration, such as triggered in response to turning off MP. The control input 528 can be coupled to the SIMO controller circuit 516, such as to provide information to the SIMO controller circuit 516 that is indicative of a conduction state of the low-side switch MN.

In some instances, the SIMO controller circuit 516 can steer the inductor current (IL) to the different output nodes (VOUT1 or VOUT2), using one or more of a first switch S1 or a second switch S2. Switches S1 and/or S2 can include one or more of a single transistor (e.g., a p-channel transistor) or a transmission gate structure depending on the nominal or specified output voltage for the output node.

As discussed in the example of FIG. 4A, the output nodes VOUT1 or VOUT2 can include their associated decoupling capacitors C1 or C2, respectively. It is now recognized that efficiency can be enhanced and spatial volume of the SIMO converter circuit 500 can be reduced, such as using an integrated circuit having a complementary metal-oxide-semiconductor (CMOS) architecture. For example, small CMOS scaling (e.g., using a 65 nm process node) can provide devices (e.g., MP, MN, S1, S2) having relatively low switching loss, allowing the SIMO converter circuit 500 switching frequency (e.g., $f_{SW}$) to increase as compared to using other technologies. As $f_{SW}$ increases, a corresponding size of the inductor L or the decoupling capacitors C1 or C2 can decrease.

Referring back to the example of FIG. 3, when the first switch 302 opens (e.g., corresponding to MP in FIG. 5), the inductor current IL can flow through the diode 310, To support this inductor current IL, however, the node VX swings to a negative voltage with respect to the second input node VIN2 (e.g., corresponding to REF in FIG. 5), reverse biasing the diode 310, so that the current IL can eventually decay to zero (e.g., assuming discontinuous conduction mode (DCM)). Generally, a diode 310 will have cut in voltage to turn on and thus the node VX can swing to a negative voltage of about a few hundred millivolts (mV) before conduction through the diode 310 is established. This can present a high resistance path from the energy source (e.g., REF node) to the inductor 304. As a result, conduction loss can increase. In the example of FIG. 5, to reduce such loss, a transistor MN is used. For example, the transistor MN can be turned on briefly for the period when the inductor L is carrying current (IL) and then turned off. Generally, MN should not be biased into conduction when the inductor current IL crosses zero as it will start discharging the charge stored on the capacitor (C1 or C2) back through the inductor L, degrading the efficiency significantly.

To avoid such discharge, MN timing can be controlled by one or more of the SIMO controller circuit 516 or the timer circuit 518. Generally, MN should not be biased into conduction when MP is conducting, because such a configuration will short VIN to REF. Secondly, MN should be biased into conduction almost immediately after MP is biased into cutoff (e.g., turned off), otherwise current may flow through a body diode of MN, such as degrading efficiency and potentially even damaging MN.

As discussed above, MN should be biased into cutoff once the inductor current IL crosses zero. In one approach, such control can be achieved such as by sensing a voltage polarity change at node VX with respect to REF or otherwise sensing the inductor current IL. However, such sensing would generally include using a high-speed comparator circuit, and such a comparator circuit would consume space and energy, particularly during conditions of light loading.

In contrast, it is recognized, among other things, that a control signal can be generated to establish conduction of MN, such as triggered to occur after a specified duration or otherwise in response to MP being turned off. A pulse width of such a control signal can be small enough so that MN turns off before inductor current IL changes for the smallest expected load current. In this manner, MN can provide a small resistance path for an early portion of the discharge phase of the inductor L. To further reduce loss, a diode structure can be included in parallel with MN. For example, a diode structure can be provided using a second n-channel transistor MN2. The second n-channel transistor MN2 can include a threshold voltage that is lower than a corresponding threshold voltage of MN. For example, MN2 can be referred to as an LVT transistor and can be configured to provide a gate-to-source threshold voltage, VT of, for example, about 200 mV.

While at a light load condition MN can be active (e.g., biased into conduction) to reduce low-side conduction loss, and at high load the diode structure provided by MN2 can be forward biased for a majority of the inductor discharge duration. For example, in a high load condition, the current through diode structure MN2 is correspondingly higher and thus the diode structure MN2 operates in a lower resistance region, thus providing enhanced efficiency.

In FIG. 5, or in other examples, the SIMO converter circuit 500 can include a DVS controller circuit 530. For example, the DVS controller circuit 530 can be coupled to respective header switches, such as header switches S3 or S4, so as to select or adjust an output voltage provided to respective functional blocks, such as the DVS block 532. For example, respective blocks such as the DVS block 532 can be provided with a $V_{DD}$ voltage selected by the DVS controller circuit 530 depending on workload, available energy, and/or one or more other parameters. In an example, such switching can occur in switching times of, for example, 1ns or less, thus allowing dynamic or real-time control of $V_{DD}$ voltage on an-instruction-by-instruction or task-by-task basis.

In an example, the respective outputs VOUT1 or VOUT2 are selected in a mutually-exclusive manner, such as using the DVS controller circuit 530. For example, a peak load can is seen by only one output at any time, such as when all blocks are connected to that output. The DVS controller circuit 530 can provide an output 526 to the SIMO controller circuit 516, such as to provide information to the SIMO controller circuit 516 indicative of an output regulation priority corresponding to a voltage scaling scheme established by the DVS controller circuit 530.

For example, a SIMO converter output attached to the highest load can be assigned a highest priority by supplying such an output (e.g., VOUT1) with IL if its voltage drops below a specified threshold as indicated by a first comparator circuit 512A. Similarly, other outputs can be catered to, such as in order of priority. For example, a dropping VOUT2 can be charged, in response to information provided by a second comparator circuit 512B, if not pre-empted by VOUT1 having a higher priority.

Figure 6:
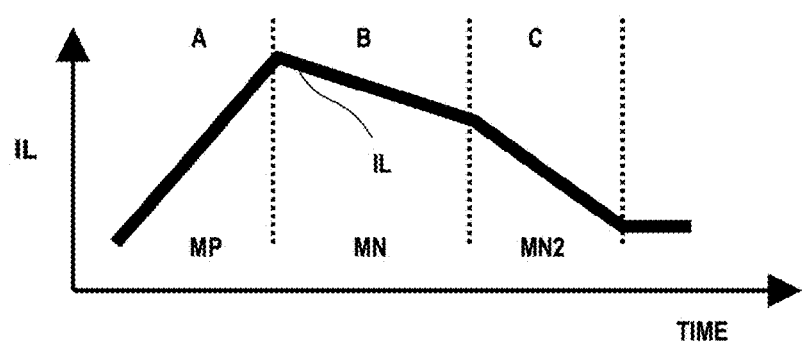
FIG. 6 is a graphical illustration of an inductor current corresponding to the inductor shown in FIG. 5.
Figure 8A:
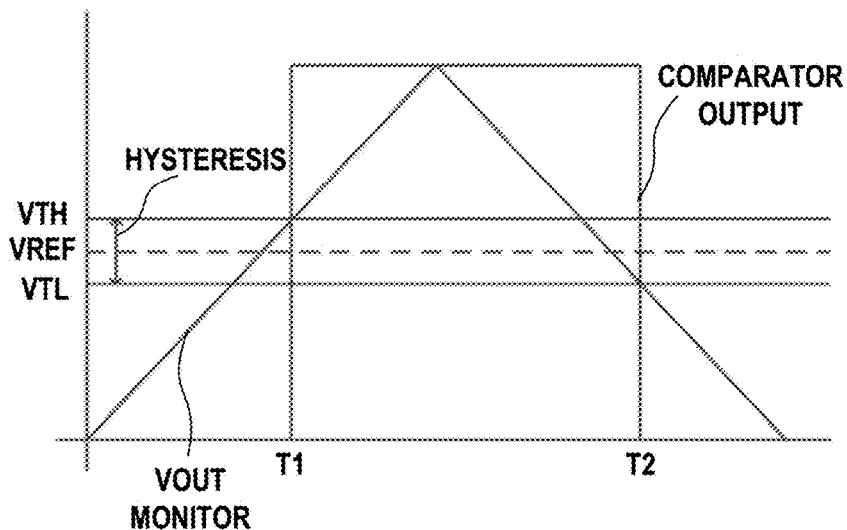
FIG. 8A is a graphical display of a comparator circuit output that can be obtained in response to respective comparator inputs for the comparator circuits in FIGS. 3 and 5.
Figure 8B:
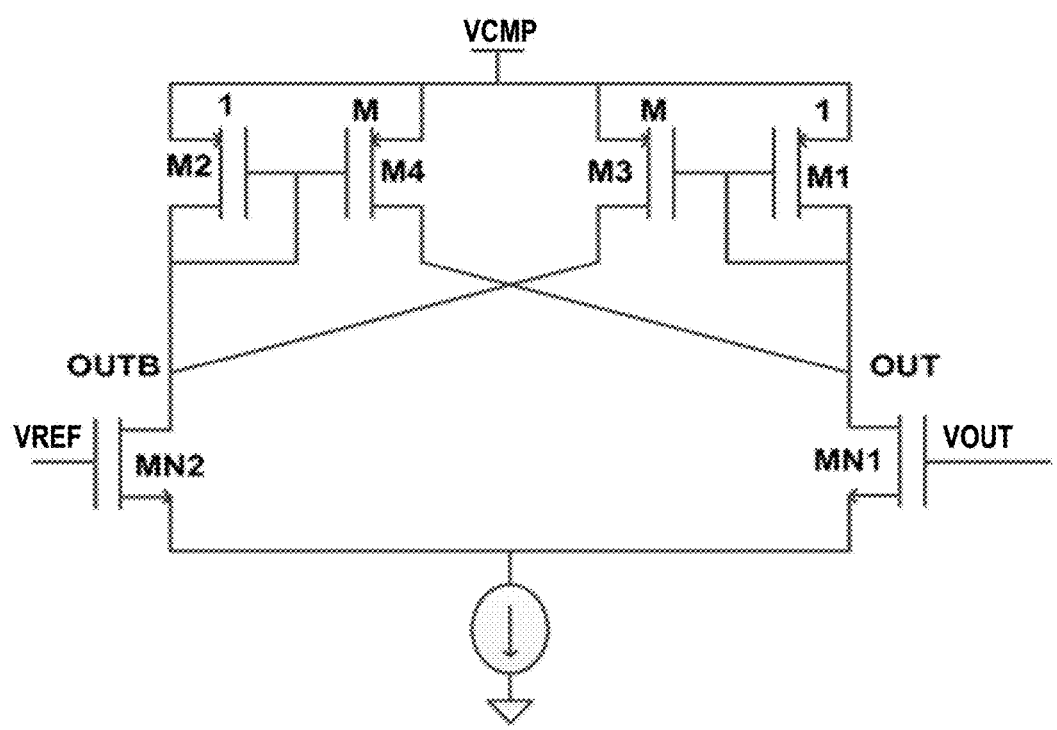
FIG. 8B is a schematic illustration of a transistor configuration that can be provide the comparator circuit output of FIG. 8A.

FIG. 6 is a graphical illustration of an inductor current corresponding to the inductor shown in FIG. 5. As discussed in FIG. 5, during a first duration A, an inductor current $I_L$ can increase, such as when a high-side switch (e.g., MP) is biased into conduction. A duration of the charging phase MP can be established at least in part using a comparator circuit configured to compare an output node voltage to a reference voltage, such as a comparator circuit including a threshold specified at least in part to provide a specified hysteresis as shown in the example of FIGS. 8A and 8B. During an early portion B of a discharge phase, a low-side switch (e.g., MN) can be biased into conduction, such as for a specified fixed duration. The specified fixed duration can be established by an on-time duration control circuit, such as to enhance efficiency during light load operation. During a late portion C of a discharge phase, a forward-biased diode structure can provide a low-resistance current path for $I_L$. Respective cycles, such as the cycle shown in FIG. 6 can be repeated for respective output nodes, such as based on a specified regulation priority, as discussed in examples elsewhere herein.

Figures 7A, 7B:
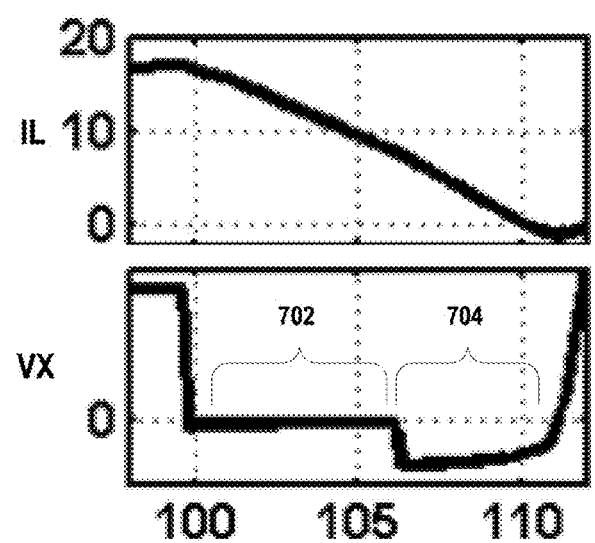
FIG. 7A is illustrates a simulated inductor current.
FIG. 7B illustrates the voltage of a first terminal of an inductor.

FIG. 7A is an illustrative example of a simulated inductor current and FIG. 7B illustrates the voltage of a first terminal of an inductor. The graphs of FIGS. 7A and 7B can be obtained during a discharge phase, such as corresponding to the examples of FIGS. 5 and 6 during a light load condition. As discussed above, in an early portion 702 of the discharge phase, a node voltage VX of a first terminal of an inductor can be clamped to a reference voltage (e.g., ground or zero volts), such as for a specified duration, using a low-side switch (e.g., MN). During a late portion 704 of the discharge phase, a diode structure can be forward biased (e.g., because the node voltage VX can be negative with respect to the reference voltage).

FIG. 8A is a graphical display of a comparator circuit output that can be obtained in response to respective comparator inputs for the comparator circuits in FIGS. 3 and 5. A delay in comparator response can be used to establish an on-time duration, such as for a high-side switch controlled at least in part using the comparator circuit output (e.g., a p-channel transistor that can become conductive when the comparator output is low and can become inhibited from conduction when the comparator output is high).

A first input of the comparator can be coupled to an output node voltage or a voltage proportional to the output node voltage (e.g., VOUT MONITOR). A second input of the comparator can be coupled to a reference voltage, VREF, such as corresponding to a target or nominal output voltage. The comparator circuit can include a specified hysteresis, which can be used at least in part to limit or otherwise establish a ripple of an output voltage provided by the SIMO converter circuit of FIG. 3 or 5. In an example, the hysteresis window can be defined using an upper threshold VTH, and a lower threshold VTL, such as can be specified relative to the reference voltage VREF.

For example, when VOUT<VTL, the high-side switch can be turned on, which can charge an inductor, which then can increase VOUT. As VOUT crosses VTH at T1 (e.g., VOUT>VTH), the high-side switch can be turned off, such as allowing a decoupling capacitor or other energy storage device to supply the load. As VOUT drops below VTL, at T2 (e.g., VOUT<VTL), the high-side switch can again be turned on, unless preempted by another output based on a specified regulation priority. In this manner, both a switching frequency and an on-duration of the high-side switch can be modulated in response to changing loads. For example, a switching frequency can be lower and a pulse width of the on-duration of the high-side switch can be shorter at lighter loads. A tradeoff can exist between switching frequency and ripple magnitude. For example, if higher ripple can be tolerated, changing the hysteresis to lower the switching frequency can improve efficiency but can also increase ripple. In another example, in an application including a ULP SoCs, more ripples can be tolerated because such an ULP SoC can include a relatively low operating clock rate.

FIG. 8B is a schematic illustration of a transistor configuration that can be provide the comparator circuit output of FIG. 8A. In an example, transistors MN1 and MN2 can establish a differential pair and transistors M1 through M4 can establish an active load of the comparator circuit. M1 and M2 can be sized similarly, and M3 and M4 can be larger in area such as to provide higher drive strength than M1 and M2, such as to provide hysteresis.

For example, when VOUT is lower than VREF, most of the current can flow through MN1, and thus the comparator output OUT is low. As VOUT increases, M2 becomes more strongly biased into conduction. When VOUT is about equal to VREF, the drive of MN2 is about equal to MN1, however M3 has higher drive strength than M1 and so MN2 needs more current to pull OUTB down. This means that VOUT must exceed VREF by a margin corresponding to VTH in FIG. 8A, to drive OUTB low. Similarly, VOUT must be less than VREF by a margin corresponding to VTL in FIG. 8A, to drive OUT low.

Figure 9:
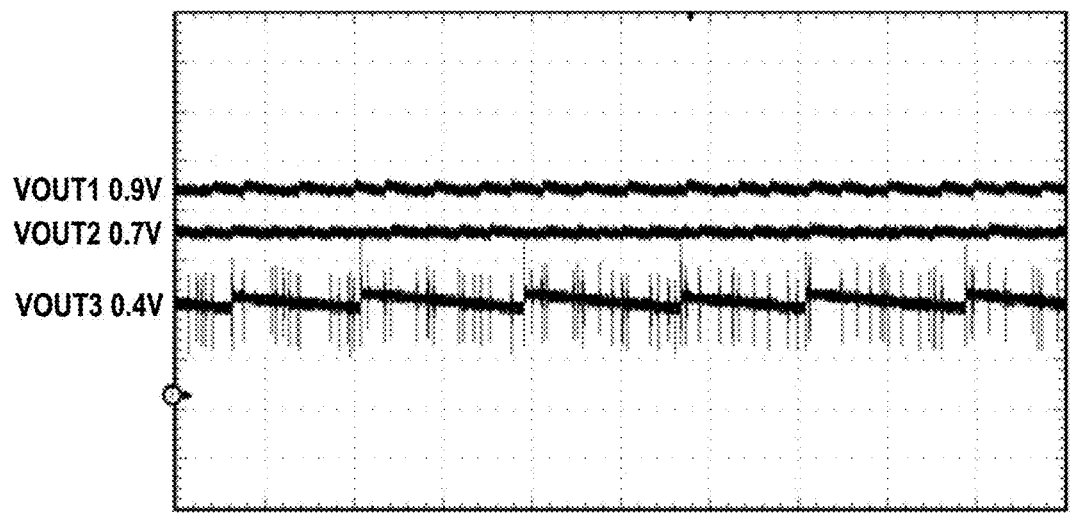
FIG. 9 is an illustrative example of respective measured output node voltages that can be obtained from a SIMO converter circuit shown in FIG. 5.

FIG. 9 is an illustrative example of respective measured output node voltages that can be obtained from a SIMO converter circuit shown in FIG. 5. In FIG. 9, the y-axis represents voltage and the x-axis represents time. Such a SIMO converter circuit can be configured to generate three respective output voltages of approximately 0.9 VDC (e.g., VOUT1), approximately 0.7 VDC (e.g., VOUT2), and approximately 0.4 VDC (e.g., VOUT3), by using an input voltage of about 1V or more.

Figure 10:
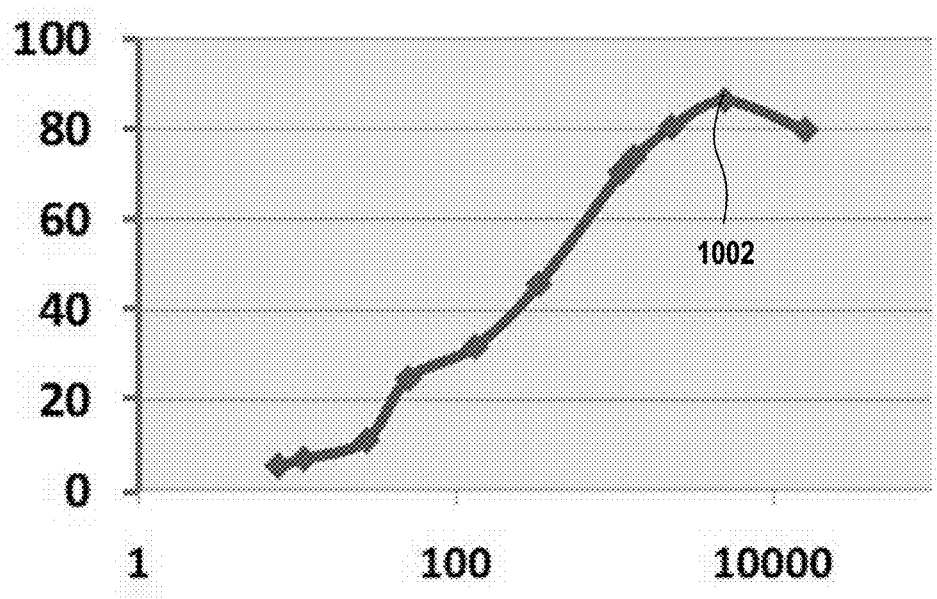
FIG. 10 is an illustrative example of a measured efficiency of a 0.9 VDC converter circuit, such as provided by an output of the multi-output SIMO converter circuit as shown in FIG. 5, plotted with respect to a load current.

FIG. 10 is an illustrative example of a measured efficiency of a 0.9 VDC converter circuit, such as provided by an output of the multi-output SIMO converter circuit as shown in FIG. 5, plotted with respect to a load current. In FIG. 10, the y-axis represents efficiency as a percentage, and the x-axis represents load current (e.g., in units of microamps). An efficiency at 1002 approaches approximately 86% in this case.

Figure 11:
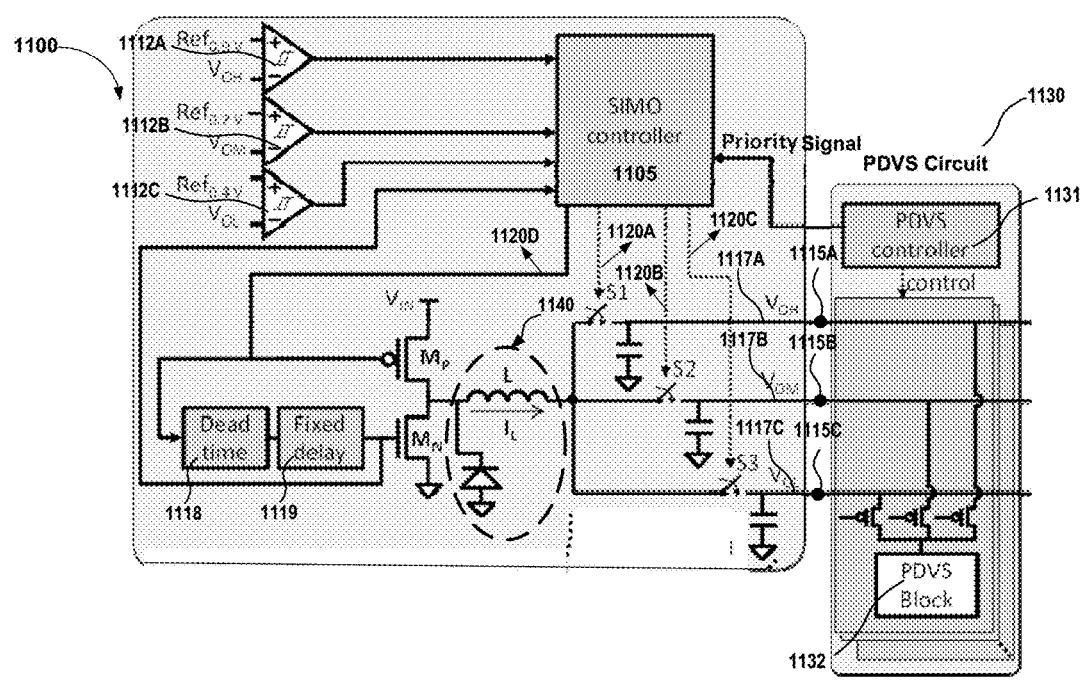
FIG. 11 is a schematic block diagram that shows the implementation of the SIMO DC-DC converter circuit to drive a PDVS system, according to an embodiment.

FIG. 11 is a schematic block diagram that shows the implementation of the SIMO DC-DC converter circuit to drive a PDVS system, according to an embodiment. First, the discussion associated with FIG. 11 relates to the overall system architecture and the SIMO control scheme. Second, a description of the hysteretic control scheme to reduce the size of the capacitors is provided. Finally, the SIMO circuit with a combination of a PDVS load is discussed with respect to cross-regulation and higher ripple associated with the SIMO architecture.

The SIMO DC-DC converter circuit 1100 includes a SIMO controller 1105 and a set of output nodes 1115A-C. The PDVS circuit 1130 includes a PDVS controller 1131 and a PDVS block 1132. The PDVS circuit 1130 includes multiple PDVS blocks. The PDVS circuit 1130 is operatively coupled to the SIMO DC-DC converter circuit 1100, where the PDVS circuit 1130 has a set of operational blocks 1132; each operational block from the set of operational blocks can draw power from one supply voltage rail from a set of supply voltage rails 1117A-C. Additionally, each output node from the set of output nodes is uniquely associated with a supply voltage rail from the set of supply voltage rails. For example, the output node 1115A is associated with the voltage rail 1117A, the output node 1115B is associated with the voltage rail 1117B, and the output node 1115C is associated with the voltage rail 1117C.

The SIMO DC-DC converter circuit 1100 can include a first comparator 1112A and a second comparator 1112B (a third comparator 1112C is also shown in FIG. 11), where the first comparator 1112A can receive a first bias current (labeled "Ref 0.9V") and produce a control signal 1120A (the control signals are labeled as 1120A-D) to select a first output node from the plurality of output nodes when the first output node experiences a first load (e.g., a PDVS block 1132). Similarly the second comparator 1112B can also receive a second bias current (labeled "Ref 0.7V") and produce a control signal 1120B to select the first output node from the set of output nodes when the first output node experiences a second load lower than the first load. The second bias current is less than the first bias current. Additionally, a power consumption of the second comparator 1112B can be less than the power consumption of the first comparator 1112A when the SIMO DC-DC converter circuit is operative. The efficiency of the SIMO DC-DC converter circuit 1100 is higher when the second comparator 1112B produces the control signal to select the first output node than when the first comparator 1112A produces the control the signal to select the first output node.

The second comparator 1112B can also be placed in an off mode with a power consumption less than a power consumption during an operative mode, when the first comparator 1112A produces the control signal to select the first output node. Similarly, the first comparator 1112A can be placed in an off mode with a power consumption less than a power consumption during an operative mode, when the second comparator 1112B produces the control signal to select the first output node. In some instances, the SIMO DC-DC converter circuit 1100 and the PDVS circuit 1130 can be included within an integrated circuit (IC), where the SIMO DC-DC converter circuit 1100 can prioritize a single output node from the set of output nodes within a time period to indicate which operational blocks from the set of operational blocks (e.g., PDVS block 1132) of the PDVS circuit 1130 connect to which supply voltage rails from the set of supply voltage rails during the time period.

The SIMO DC-DC converter circuit 1100 includes a set of switches S1-S3 operatively coupled to the set of comparators 1112A-1112C, where each comparator from the set of comparators 1112A-1112C is uniquely associated with a switch from the set of switches S1-S3. More specifically, comparator 112A is associated with switch S1, comparator 112B is associated with switch S2, and comparator 112C is associated with switch S3. Additionally, each comparator from the set of comparators 1112A-1112C is associated with a lower hysteresis threshold from a set of lower hysteresis thresholds and an upper hysteresis threshold from a set of upper hysteresis thresholds, and each comparator from the set of comparators 1112A-1112C can produce a pulse having a width based on the hysteresis thresholds such that the uniquely associated switch is controlled in response to that pulse.

Additionally, each comparator from the set of comparators 1112A-1112C receives a bias current from a set of bias currents and a feedback signal from the output node for that comparator 1112A or 1112B or 1112C, where at least one bias current from the set of bias currents differs from the remaining bias currents from the set of bias currents. The set of comparators 1112A-1112C and the set of switches S1-S3 can collectively select an output node from the set of output nodes 1115A-1115C based on (1) a condition of each output node from the set of output nodes 1115A-1115C, and (2) a relative priority of each output node from the plurality of output nodes 1115A-1115C.

The SIMO DC-DC converter circuit 1100 that includes a SIMO controller 1105, (hysteretic) comparators 1112A-1112C, buck DC-DC converter 1140 and provides three output nodes 1115A-1115C at supply power rails 1117A-1117C. As described above, the PDVS circuit 1130 includes a PDVS controller 1131 and a PDVS block 1132. The comparators 1112A-1112C, the SIMO controller 1105 and the DC-DC buck converter 1140 implement the control loop to provide the output voltages to the output nodes 1115A-1115C. The SIMO controller 1105 steers the inductor current ($I_L$) to different supply power rails 1117A-1117C through switches S1-S3. The (hysteretic) comparators 1112A-1112C compares each supply power rail 1117A-1117C to its reference voltage and provides a digital output. The (hysteretic) comparators 1112A-1112C also control the switching turn-on time of the selected comparator 1112A-1112C which will be described in greater detail herein. The (hysteretic) comparators 1112A-1112C control the regulation and switching of each supply power rail 1117A-1117C. These comparators 1112A-1112C can be disabled when a particular supply power rail 1117A-1117C is not needed in the system shown in FIG. 11. The digital output of the comparator 1112A-1112C is received at the SIMO controller 1105 along with the priority signal from the PDVS controller 1130. These signals are used to generate control signals for the DC-DC buck converter 1140 as well as assign switching sequence for the switches S1-S3. The priority signal from PDVS controller 1131 represents or indicates the current loading scenario on each supply power rail 1117A-1117C. The SIMO controller 1105 uses this priority signal to set the switching priority and assigns highest and lowest priority to switches S1-S3. For example, if the 0.9V supply power rail is heavily loaded, the priority is set for this supply power rail and in the event that 0.9V comparator 1112A output goes low, the SIMO controller 1105 starts steering inductor current $I_L$ into the 0.9V supply power rail. In case when all the three rails are heavily loaded, then this switching configuration can result in higher ripple or cross regulation. All the supply power rails, however, are not loaded simultaneously in a PDVS circuit 1130. As a result, higher ripple is typically not expected on the other supply power rails. Additionally, the system in FIG. 11 allows for SoC decoupling of the various capacitances that can save system level volume and cost.

The design goal of the PDVS-SIMO architecture as shown in FIG. 11 involves several parameters. First, the PDVS-SIMO architecture should be able to support lower sized capacitance with small ripple. Second, the PDVS-SIMO architecture should be able to provide high efficiency. Finally, the static power consumption of the PDVS-SIMO architecture should be small. The design presented in FIG. 11 can be used to reduce the overall system power and cost. The switching time of the converter 1140 is controlled by the comparator 1112A-1112C which helps in reducing the additional control circuit, which in turn reduces static power consumption of the system. Two approaches can be used to reduce the dimensions of the passives in the converter 1140. First, use of 65 nm advanced process nodes where the smaller CMOS technology can enable faster switching frequency for the converter 1140 which can enable lower sizes for inductor and capacitors. Second, the new hysteretic control scheme can be implemented that can further bring down the size of the capacitors to nF range.

Figure 12:
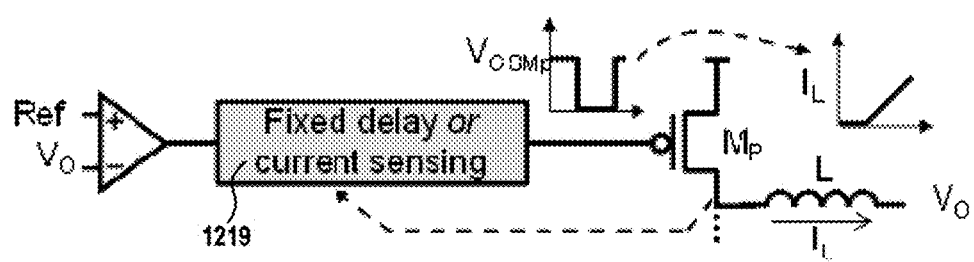
FIG. 12 shows a known control scheme to generate the High Side (HS) switching control for a DC-DC converter corresponding to a portion of the SIMO converter circuit of FIG. 11.

FIG. 12 shows a known control scheme to generate the High Side (HS) switching control for a DC-DC converter corresponding to a portion of the SIMO converter circuit of FIG. 11. Typically, two approaches, for example, can be used. In the first approach, a fixed delay is generated and the turn-on time of the HS switch (MP) is controlled by the fixed delay. This delay generates the current in the inductor $I_L$ and HS switching is enabled, followed by Low Side (LS) switching. The HS control determines the amount of energy getting transferred in each cycle. The second approach for HS control uses current sensing of the inductor L and can be more desirable for higher output power switching converters. This scheme, however, can have some inaccuracies and higher energy overhead, which makes it typically unsuitable for low-energy lower voltage systems. Additionally, fixing the current of the inductor L involves use of a high capacitance value decoupling capacitor to reduce the ripple. The inductor current $I_L$ gets stored on the capacitor (shown in FIG. 11) for the cases of light load. This can cause higher ripple if the capacitor is small.

Figure 13:
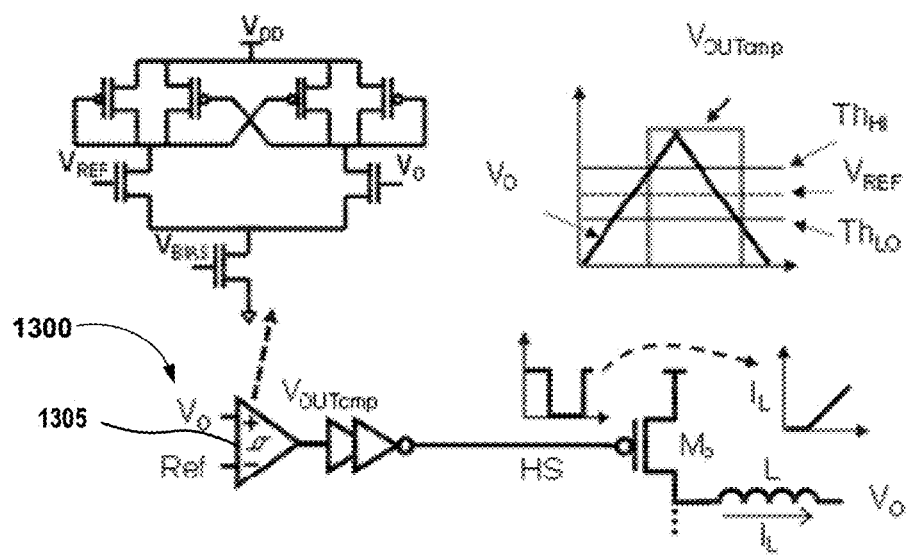
FIG. 13 is a schematic illustration of the circuit for an HS control scheme, according to an embodiment.

FIG. 13 is a schematic illustration of the circuit for an HS control scheme, according to an embodiment. The circuit 1300 uses a hysteretic comparator 1305 to control the HS switch. The hysteresis of the comparator 1305 and the delay of the comparator 1305 set the ripple on the supply power rail. The high side transistor, $M_P$ is turned ON when $V_O$ goes below $Th_{LO}$ of the hysteretic comparator, where $Th_{HI}$ and $Th_{LO}$ are the higher and lower thresholds of the comparator 1305, respectively, with hysteresis given by, $Th_{HI}$-$Th_{LO}$. The inductor L starts charging the output rail and its current starts ramping up. Once $V_O$ crosses $Th_{HI}$, $M_P$ is disabled and inductor current $I_L$ starts discharging through to the output capacitor.

Figure 14A:
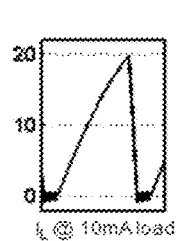
FIGS. 14A-H shows the behavior of the (High-side) HS control circuit of an individual DC-DC converter circuit.
Figure 14B:
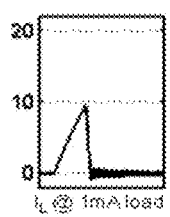

FIGS. 14A-H shows examples of the behavior of the (High-side) HS control circuit of an individual DC-DC converter circuit. Specifically, FIG. 14A and FIG. 14B are illustrative examples of a simulated inductor current that can be obtained for respective load currents, such as using the SIMO DC-DC converter circuit topology as shown in FIG. 11. As shown in FIG. 14A, a higher load current (e.g., 10 mA) increases both a peak inductor current $I_L$ and a duration of the inductor current $I_L$ pulse. Similarly, as shown in FIG. 14B, a lower load current (e.g., 1 mA) correspondingly reduces a peak inductor current $I_L$ and a duration of the inductor current $I_L$ pulse.

Figure 14C:
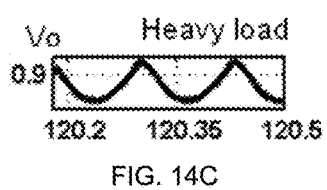
Figure 14D:

FIG. 14C is an illustrative example of a simulated output node voltage VOUT of a SIMO DC-DC converter circuit topology, such as shown in the example of FIG. 11. FIG. 14D is an illustrative example of a simulated gate-to-source voltage VGSMP that can be provided to a high-side (HS) p-channel transistor, such as to obtain the output node voltage shown in the illustrative example of FIG. 14C. As shown in FIG. 14D, durations where VGSMP is low correspond to duration where a high-side switch (e.g., MP) is conducting.

Figure 14E:
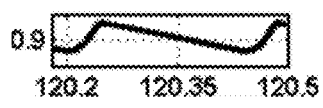
Figure 14F:
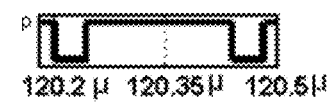
Figure 14G:
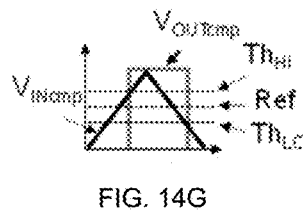
Figure 14H:
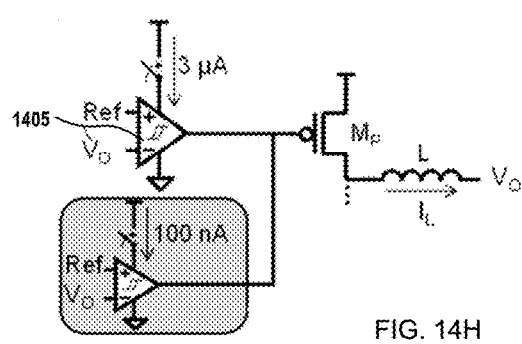

FIG. 14E is an illustrative example of a simulated output node voltage VOUT of a SIMO DC-DC converter circuit topology, such as shown in the example of FIG. 11. FIG. 14F is an illustrative example of a simulated gate-to-source voltage VGSMP that can be provided to a p-channel transistor, such as to obtain the output node voltage shown in FIG. 14E. The examples of FIGS. 14C and 14D show a load condition that is relatively heavier than the examples of FIGS. 14E and 14F. In the lighter-load examples of FIGS. 14E and 14F, an on-duration of the high-side switch can be relatively shorter than in the example of FIGS. 14C and 14D, and a duration between on-pulses can be longer. FIG. 14 G is similar to FIG. 8A and illustrates the hysteresis thresholds. FIG. 14H is a schematic illustration of a portion of the DC-DC converter circuit.

Said in another way, in general, FIGS. 14A-H shows that at the light load condition the voltage at the output rises quickly, because the current drawn from the output capacitor is low and most of the current is used to charge the capacitor. Therefore, the hysteresis of the comparator 1405 (as seen in FIG. 14H) sets a lower inductor current $I_L$ and ensuring lower ripple. If the load current increases, the rise time of the output voltage increases, as a result $M_P$ is on for longer duration of time (because higher current is drawn out of the output). This increases the peak current $I_L$ in the inductor L. The circuit of FIG. 14H adapts itself with the output load. This scheme makes the ripple on the supply power rail less dependent on the output capacitor (not shown in FIGS. 14A-H).

Figure 15:
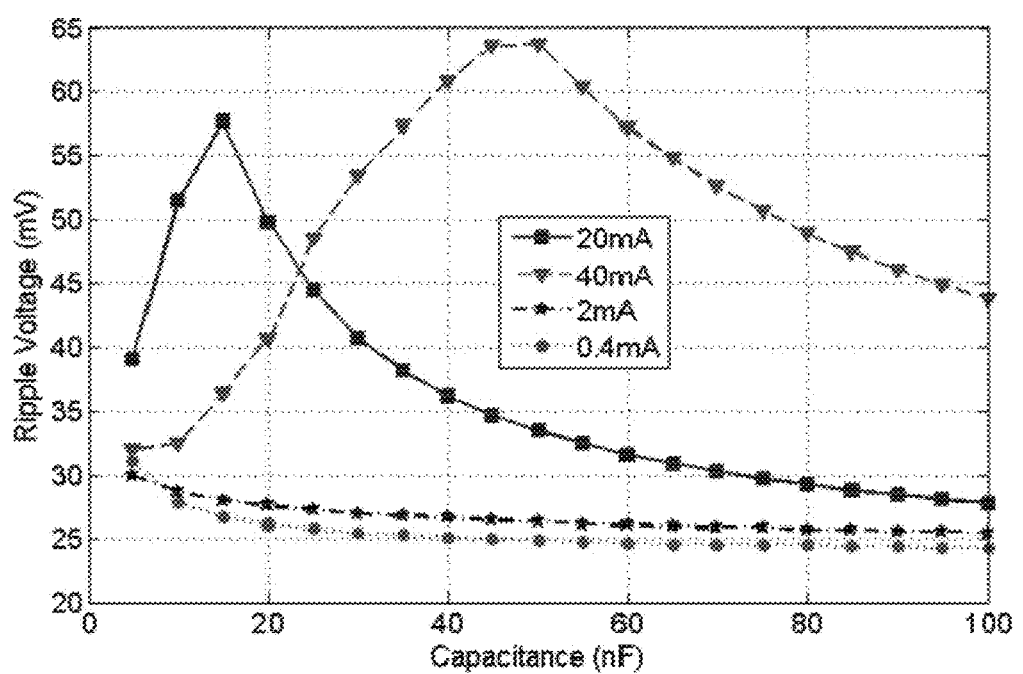
FIG. 15 shows simulation results for the ripple voltage for different values of decoupling capacitors at different loads.

FIG. 15 shows simulation results for ripple voltage for different values of decoupling capacitors at different loads. The different graphs plotted represent different load currents. The ripple voltage varies from 30-60 mV for sample values of 0.8V $V_{DD}$ and 1.2V $V_{in}$. A 4.3 nF of output capacitor gave approximately 5% ripple on the rail. This value of capacitance is significantly smaller than the typical decoupling capacitors (µF range) used on supply power rails in a DC-DC converter. At these values, the capacitance can easily be integrated on-chip. A significant percentage of the capacitance can come from the parasitic capacitance of the cores connected to these supply power rails.

Figure 16A:
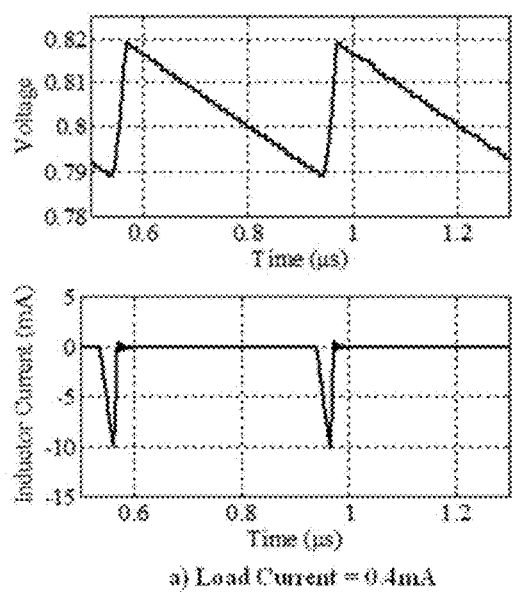
FIGS. 16A-B shows the simulation results of the output voltage and inductor current at light load and heavy load conditions, respectively.
Figure 16B:
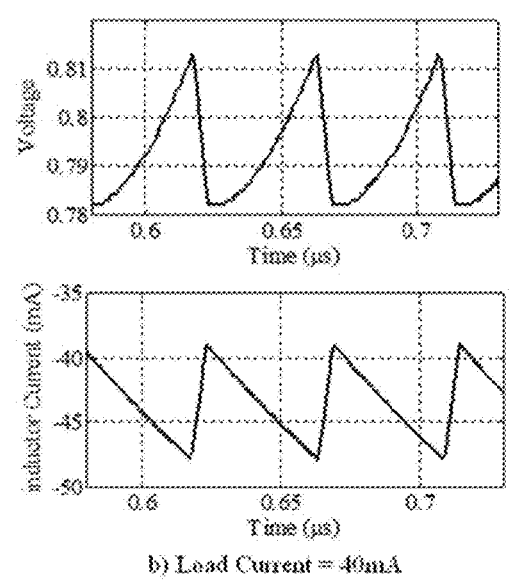

The HS control scheme described herein can support loads up to 50 mA and can operate the SIMO converter circuit in both continuous conduction mode (CCM) and discontinuous conduction mode (DCM). At light load condition the SIMO converter circuit goes into DCM. The HS turn-on time is used to charge the inductor. After LS control cycle the inductor current $I_L$ goes to zero. However, $V_O$ goes below $Th_{LO}$ later than LS cycle owing to the light load condition. The HS control scheme starts again, once $V_O$ goes below $Th_{LO}$. Operating in DCM at light load helps in achieving acceptable efficiency as well as controlled ripple. The SIMO converter circuit operates in CCM at high load condition. At high load condition, $V_O$ goes below $Th_{LO}$ before inductor current goes to zero and hence conducts continuously. Operating in CCM helps in targeting heavy load condition for the SIMO converter circuit. FIG. 16 shows the simulation results of the output voltage and inductor current at light load and heavy load conditions, respectively. FIG. 16A shows the simulation results of the output voltage and inductor current at load current of 0.4 mA. FIG. 16B shows the simulation results of the output voltage and inductor current at load current of 40 mA. The results of FIG. 16A-B shows that the SIMO converter circuit operates in CCM at high load conditions (FIG. 16B) and in DCM at light load conditions (FIG. 16A).

Figure 17A:
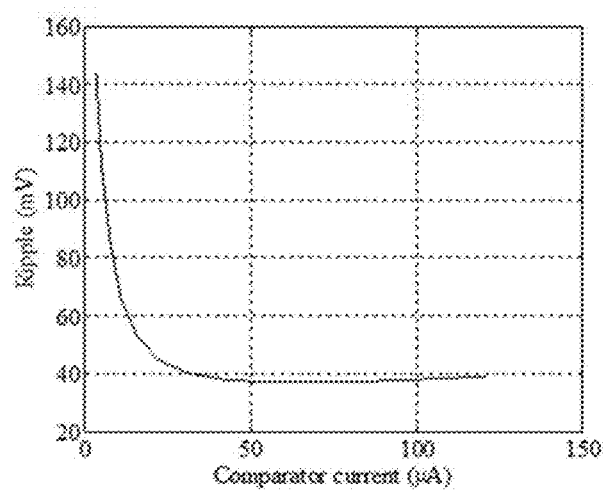
FIG. 17A shows an example of the variation of ripple with the comparator quiescent current.

The static power consumption of the HS circuit is dictated by the power consumption of the comparator (e.g., comparator 1112A-1112C in FIG. 11). More power can be saved by lowering the comparator quiescent current. The performance of the comparator, however, also controls the amount of ripple seen on the supply power rail. For example, if the comparator has higher delay (lower power), then the response of the comparator to the changes at the output voltage will be slower, which will result in elevated ripple. FIG. 17A shows an example of the variation of ripple with the SIMO comparator quiescent current. The ripple decreases with increased quiescent current. The ripple becomes constant after 25 μA of comparator current. After this point, the hysteresis of the comparator and output capacitor controls the amount of ripple. In the example of FIG. 17A, a selection of 25 μA quiescent current was made for the comparator of 0.9V and 0.7V supply power rails and two comparators were used for 0.4V supply power rail. One comparator had a 3 μA quiescent current while other comparator had a 100 nA quiescent current. This was done to lower the static power consumption of the converter for the low power mode, where all the cores in PDVS system can be connected to 0.4V. The other two converters can be disabled while 0.4V rail will supply the $V_{DD}$ with higher ripple.

Figure 17B:
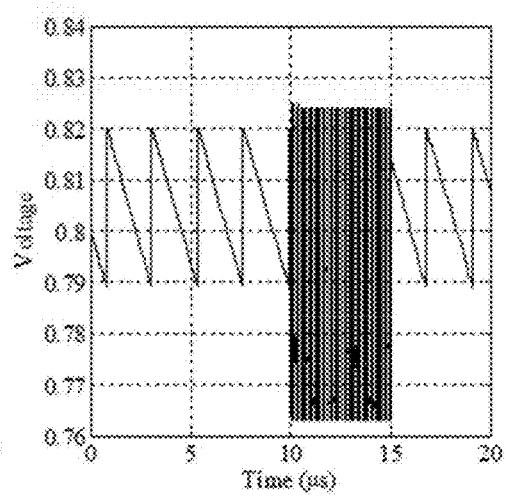
FIG. 17B shows an example the condition of a comparator when output load changes from 100 μA to 10 mA in 10 ns.

Hysteresis of the comparator is also used in determining the peak inductor current, which is used in determining the overall efficiency of the SIMO converter particularly at light load conditions. At higher value of inductor current, conduction loss increases and thus decreasing the efficiency, while at lower value of the inductor current, the switching loss reduces the efficiency. The inductor current is controlled through the hysteresis in the comparator. At high load conditions the losses are governed by the load current as the SIMO converter operates in continuous conduction mode. The SIMO comparator and the output capacitor also affect for the transient behavior of the SIMO converter. FIG. 17B shows an example of the condition of a SIMO comparator when output load changes from 100 μA to 10 mA in 10 ns. As shown in FIG. 17B, the SIMO converter can continue to regulate even for a fast change in load condition. Owing to the small size of the output capacitor, however, a very sharp change in output load to high load such as 40-50 mA can result in overshoot or undershoot at the output rail. The SIMO converter uses a few μs to recover under such conditions. This happens because the converter goes from DCM to CCM in very short time which can result in higher inductor current build up and can cause higher ripple. If the load changes slowly, however, then higher ripple is not seen on the supply power rail.

Figure 18A:
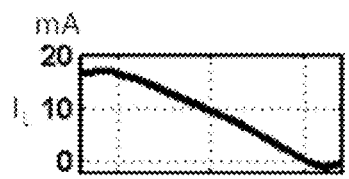
FIGS. 18A-D shows the behavior of the (Low-side) circuit of a SIMO DC-DC converter circuit.
Figure 18C:
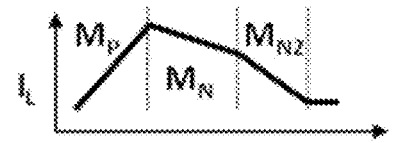
Figure 18B:
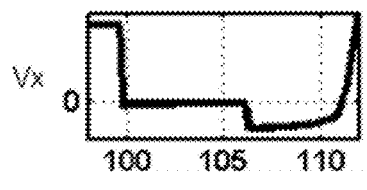
Figure 18D:
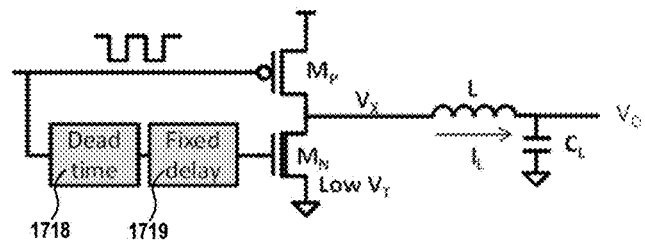

FIGS. 18A-D shows the low side (LS) control of an individual SIMO DC-DC converter circuit, according to an embodiment. Generally, FIGS. 18A-D show that the low side control is implemented to keep the LS switch on for fixed time. For the rest of the time, LS conducts as a diode. The LS switch is implemented with a low threshold voltage (LVT) device. As a result, the diode does not contribute to significant loss. A known scheme for LS control implements a zero detection comparator. For light load condition and lower inductor current, the performance for zero detects comparator is very high. For higher performance, static current in the comparator becomes higher which adds significant overhead on the DC power consumption of the converter. The scheme to implement fixed delay turn on time for LS eliminates this overhead with smaller penalty in efficiency. FIG. 18A is similar to FIG. 7A, FIG. 18B is similar to FIG. 7B, and FIG. 18C is similar to FIG. 6. FIG. 18D is a schematic illustration of a portion of the SIMO DC-DC converter circuit.

Figure 19:
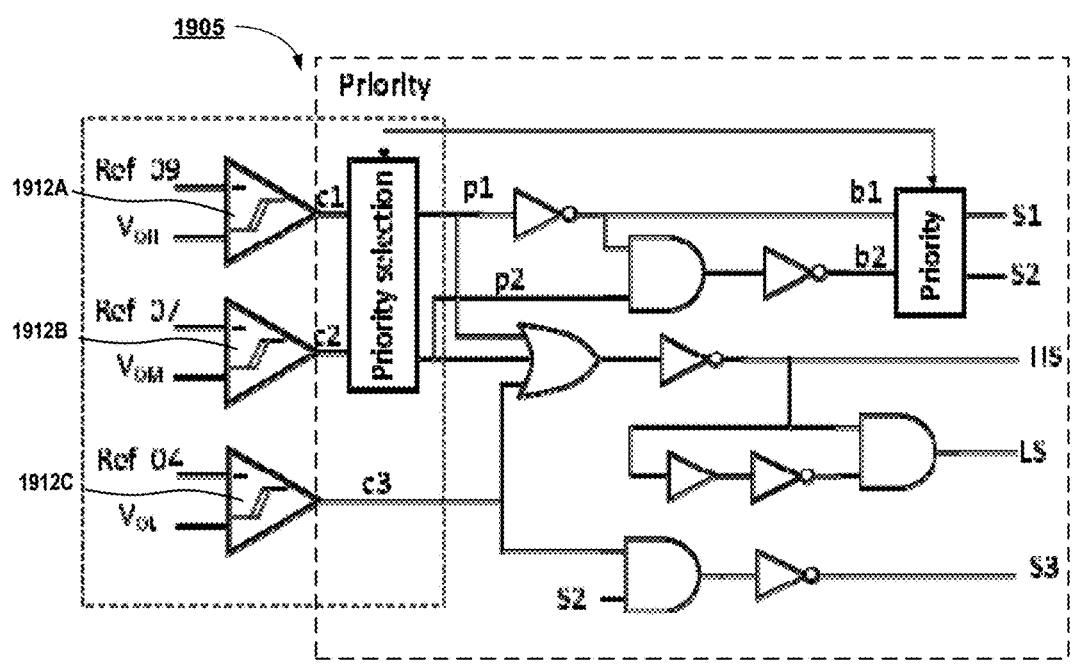
FIG. 19 is a circuit diagram of a SIMO controller, according to an embodiment.

FIG. 19 is a circuit diagram of a SIMO controller, according to an embodiment. In FIG. 19, the SIMO controller 1905 is operably coupled to three comparators 1912A-1912C. The HS control is enabled when any one of the three (hysteretic) comparator 1912A-1912C output goes high. At this time LS is disabled. Once HS is disabled, LS turns on for a given pulse width (as shown in FIG. 18). Switches S1-S3 are the SIMO switches for 0.9V, 0.7V, and 0.4V rails redrawn here from FIG. 11. The priority selection selects between c1 and c2 and correspondingly S1 and S2. For example, if 0.7V rail has higher priority, then c2 gets connected to p1 and c1 to p2. Similarly, b1 gets connected S2 and b2 gets connected S1. Only one switch out of S1, S2, and S3 is turned on at any given time. Priority selection plays a role in selecting a particular switch. If more than one supply power rail is below its $Th_{LO}$, then the switch corresponding to the supply power rail with higher priority is turned on. A higher priority is assigned to the rail with the higher load. This design suits PDVS systems well. If one supply power rail is heavily loaded, then other supply power rails are going to be lightly loaded in PDVS. Additionally, because load information is well known in the PDVS circuit (through the header switch connection), priority can be assigned correctly.

In this scheme, the supply power rail with higher load gets serviced first which prevents the supply power rail from having higher ripple. The supply power rail with lower load discharges slowly and can be serviced in the meantime. The SIMO controller 1905 can undergo higher cross regulation in the case when difference in load becomes too large among supply power rails. This happens in CCM mode of operation. If one supply power rail is heavily loaded with, for example, 40-50 mA current, while other rail is lightly loaded at, for example, 10-100 μA current, then the lightly loaded supply power rail can charge up because of the higher current present in the inductor. One method to overcome this limitation is to short both the terminals of the inductor, which results in energy loss. Hence, the extra current is dumped on the 0.4V rail which has the least priority. In the event when voltage goes higher, a clamp can be used to control the voltage at 0.4V supply power rail.

Figure 20A:
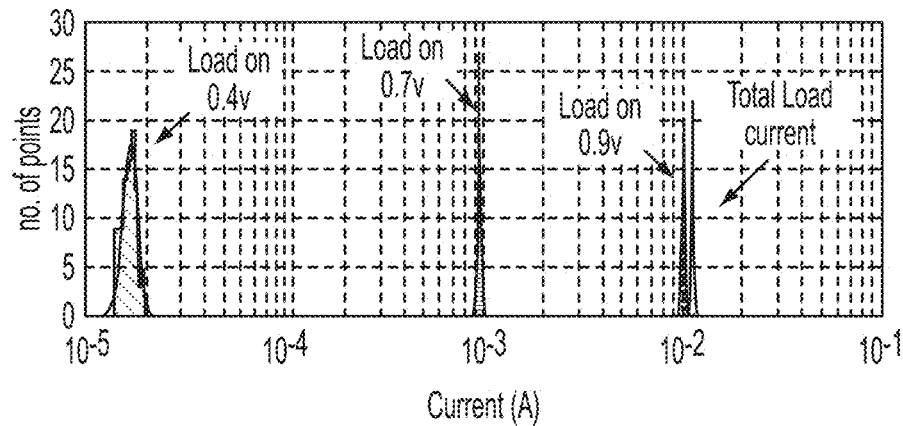
FIGS. 20A-B each shows an example of the distribution of load current for different scenarios on the output rails.
Figure 20B:
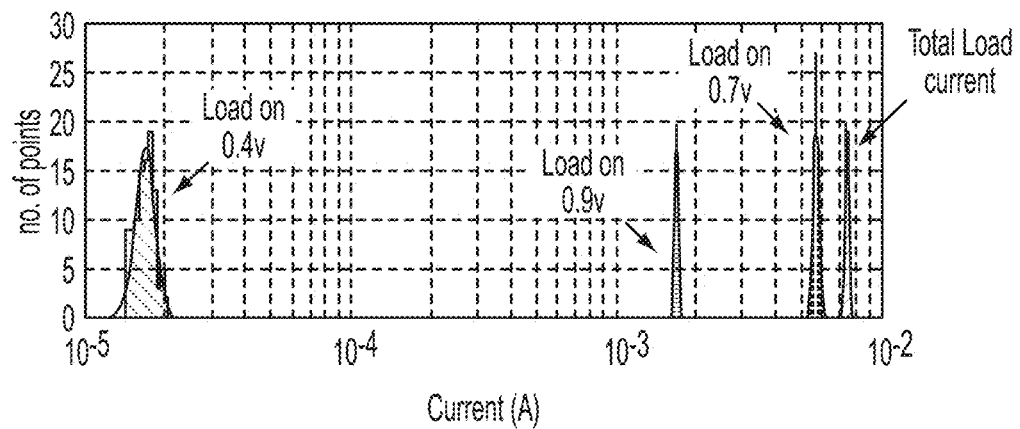

FIGS. 20A-B shows the distribution of load current for different scenarios on the output supply power rails. FIG. 20A shows the cases when most of the cores are connected to the 0.9V rail and FIG. 20B shows the case when most of the cores are connected to the 0.7V supply power rail, respectively. FIGS. 20A-B provides an insight that if one $V_{DD}$ supply power rail is heavily loaded (case when most of the cores are connected to that $V_{DD}$) other $V_{DD}$ supply power rails are lightly loaded. This is a unique characteristic of PDVS circuits that can be used to the advantage of SIMO converter design. This feature can be used to address the issue of cross-regulation in SIMO converters. Cross-regulation arises in SIMO converters usually operating in CCM, when the changes in load current of one of the supply power rail results in the change of output voltage of another supply power rail. This happens largely because of the load transients on supply power rails in a system. Often, SIMO converters are over-designed to address the worst case load transients to address cross-regulation. For the well-defined loading configurations in a system implementing PDVS, the load transients are typically known in advance. It is also typically known that which, of the three supply power rails is going to be heavily loaded and which is lightly loaded at any point in time. This information can be easily obtained by scrutinizing the number of cores (or type of cores) getting connected to given supply power rail at a given time because the information is already known or needed to configure the header switches in PDVS (see FIG. 2). Such information is used in the SIMO converter design to set the priority of the switching supply power rails. For example, in some instances, if a SIMO is designed to provide 0.9V, 0.7V and 0.4V supply power rails and 0.9V supply power rail is heavily loaded, then 0.9V rail is set on the priority. In such instances, the 0.9V supply power rail is regulated first and followed by the 0.7V and 0.4V rails. If loading information is not known priority cannot be set correctly and higher cross-regulation can be seen on the supply power rails. In order to maintain the supply power rails within the specified error, often higher value of capacitors are used with capacitances in μF range. Here, however, the SIMO converter circuit can be used in conjunction with the PDVS circuit to significantly lower the value of decoupling capacitor used in the proposed SIMO converter.

In PDVS circuits, the abrupt change of load due to DVS control is deterministic. If most of the cores switch to 0.7V rail from the 0.9V rail, the PDVS controller will indicate this via a signal to SIMO converter, which will prioritize the 0.7V rail. The feed-forward information can be used to dynamically reassign the priority that controls cross regulation due to abrupt load transition. This eliminates complex feedback schemes that will also reduce efficiency at light load conditions.

Figure 21A:
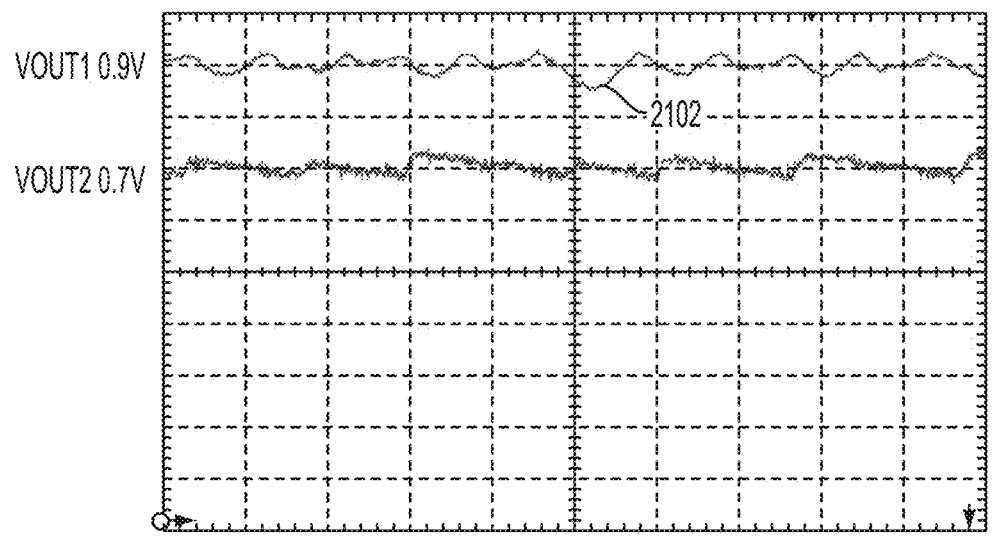
FIG. 21A is an illustrative example of respective measured output node voltages, such as can be obtained from the SIMO DC-DC converter circuit as shown in FIG. 11, according to a specified output regulation priority.

FIG. 21A is an illustrative example of measured output node voltages, such as can be obtained from the SIMO DC-DC converter circuit 1100 as shown in FIG. 11, according to a specified output regulation priority. Such a SIMO DC-DC converter circuit can be configured to generate three respective output voltages of approximately 0.9 VDC (e.g., VOUT1), approximately 0.7 VDC (e.g., VOUT2) and approximately 0.4 VDC (e.g., VOUT3), such as using an input voltage of about 1V or more.

Figure 21B:
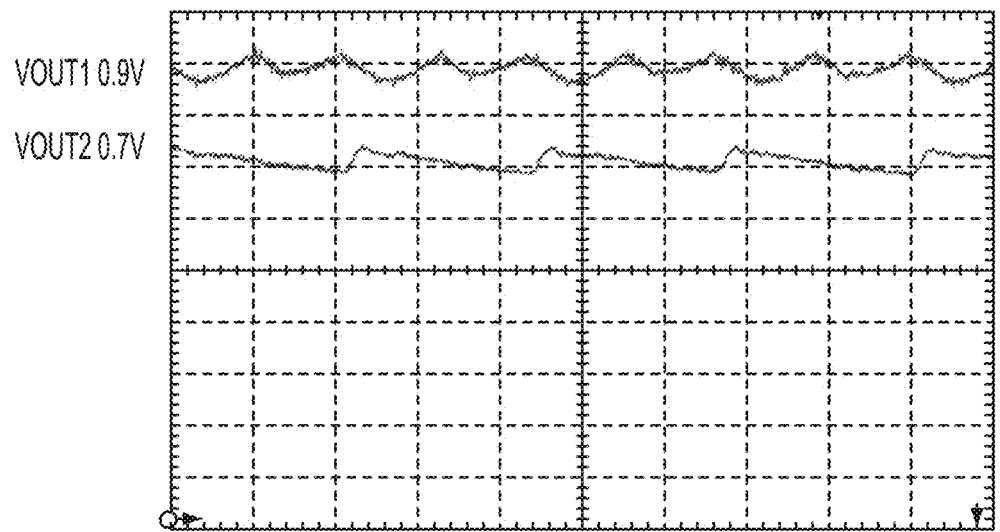
FIG. 21B is an illustrative example of respective measured output node voltages, such as can be obtained from the SIMO DC-DC converter circuit as shown in FIG. 11, according to a second, different output regulation priority.

FIG. 21B is an illustrative example of measured output node voltages, such as can be obtained from the SIMO DC-DC converter circuit 1100 as shown in FIG. 11, according to a second, different output regulation priority. Such a SIMO DC-DC converter circuit can be configured to generate three respective output voltages of approximately 0.9 VDC (e.g., VOUT1), approximately 0.7 VDC (e.g., VOUT2) and approximately 0.4 VDC (e.g., VOUT3), such as using an input voltage of about 1V or more.

Cross regulation, which can refer to increased ripple on one supply power rail because of an abrupt change of load on another supply power rail, can be a major issue for multi-output regulation circuit. It is recognized that using a DVS circuit, a change in load can be deterministic. For example, if respective blocks switch from using the 0.9 VDC supply power rail to using the 0.7 VDC supply power rail, such as in response to the DVS controller circuit, a power supply regulator controller circuit can correspondingly adjust an output regulation priority to prioritize the 0.7 VDC output, or even to ignore or disable the 0.9 VDC output. In the illustrative example of FIG. 21A, the 0.9 VDC output is at a relatively lower regulation priority than the 0.7 VDC rail. Because of the difference in output regulation priority, at 2102, the 0.9 VDC rail can drop significantly, such as providing a ripple that is 30 mV larger in magnitude than a corresponding output as shown in FIG. 21B, where the 0.9 VDC rail is assigned to limit ripple to less than about 40 mV. Hence, proper assignment of priority to the different output rails based on load can help reduce ripple effects. In the FIGS. 21A and 21B, the vertical scale is about 100 mV per division.

Figure 22A:
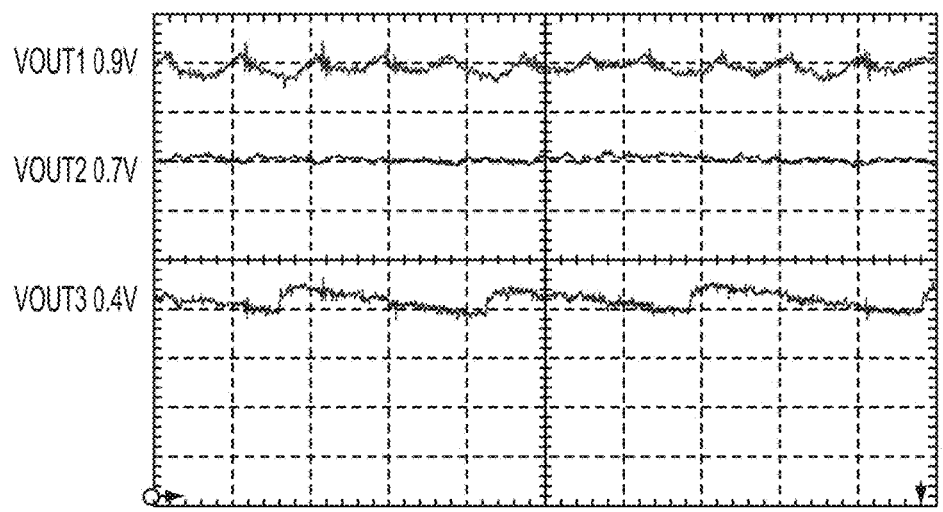
FIG. 22A is an illustrative example of the measured output node voltages, such as can be obtained from the SIMO DC-DC converter circuit as shown in FIG. 11, at a heavy load as compared to the example of FIG. 22B.
Figure 22B:
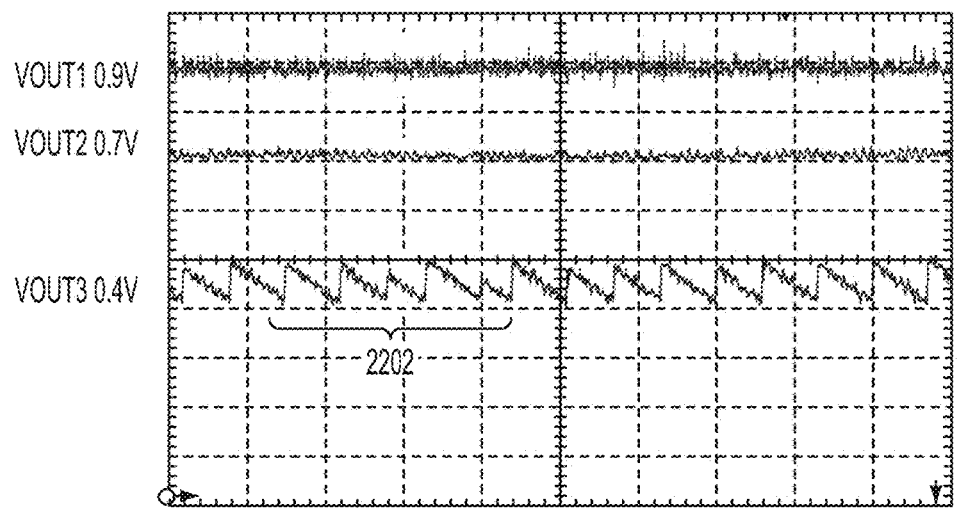
FIG. 22B is an illustrative example of the measured output node voltages, such as can be obtained from the SIMO DC-DC converter circuit as shown in FIG. 11, at a light-to-moderate load as compared to the example of FIG. 22A.

FIG. 22A is an illustrative example of the measured output node voltages, such as can be obtained from the SIMO DC-DC converter circuit 1100 as shown in FIG. 11, at a heavy load as compared to the example of FIG. 22B. Such a converter circuit can be configured to generate three respective output voltages of approximately 0.9 VDC (e.g., VOUT1), approximately 0.7 VDC (e.g., VOUT2) and approximately 0.4 VDC (e.g., VOUT3), such as using an input voltage of about 1V or more. The heavy load of the example of FIG. 22A includes respective output currents of about 10 mA on the 0.9 VDC output, about 1 mA on the 0.7 VDC output, and about 1 mA on the 0.4 VDC output. In this example, the converter circuit efficiency is 86% with a measured ripple of about 40 mV or less.

FIG. 22B is an illustrative example of the measured output node voltages, such as can be obtained from the SIMO DC-DC converter circuit 1100 as shown in FIG. 11, at a light-to-moderate load as compared to the example of FIG. 22A. Such a converter circuit can be configured to generate three respective output voltages of approximately 0.9 VDC (e.g., VOUT1), approximately 0.7 VDC (e.g., VOUT2) and approximately 0.4 VDC (e.g., VOUT3), such as using an input voltage of about 1V or more. The light-to-moderate load of the example of FIG. 22B includes respective output currents of about 10 mA on the 0.9 VDC output, about 100 μA on the 0.7 VDC output, and about 100 μA on the 0.4 VDC output. In this example, the converter circuit efficiency is 86% and in the region 2202, the converter circuit can provide sufficient inductor current $I_L$ dumps to maintain the 0.4 VDC rail at a level above 0.4 VDC (e.g., to avoid a reset condition). FIGS. 21A-B and FIGS. 22A-B together show that the high load efficiency is 86% and the low load efficiency is 62%.

Figure 23A:
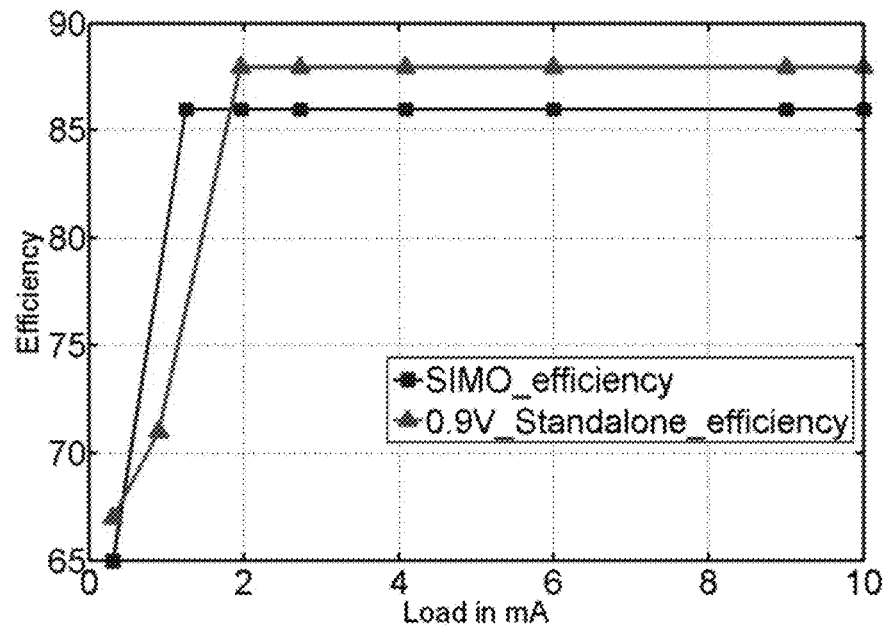
FIG. 23A is an illustrative example of the measured efficiencies of a 0.9V DC converter circuit, as can be operated stand-alone, or operated along with other outputs in a multi-output configuration.

FIG. 23A is an illustrative example of the measured efficiencies of a 0.9V DC converter circuit, such as can be operated stand-alone, or operated along with other outputs in a multi-output configuration, such as can be obtained from the SIMO DC-DC converter circuit 1100 as shown in FIG. 11. In a stand-alone configuration, a peak efficiency of the 0.9V DC output (rail) can be approximately 88%. The efficiency was measured with the load current on the 0.9V DC output (or rail) in the SIMO configuration, where the load on the 0.7V and 0.4V rail was 100 μA.

Figure 23B:
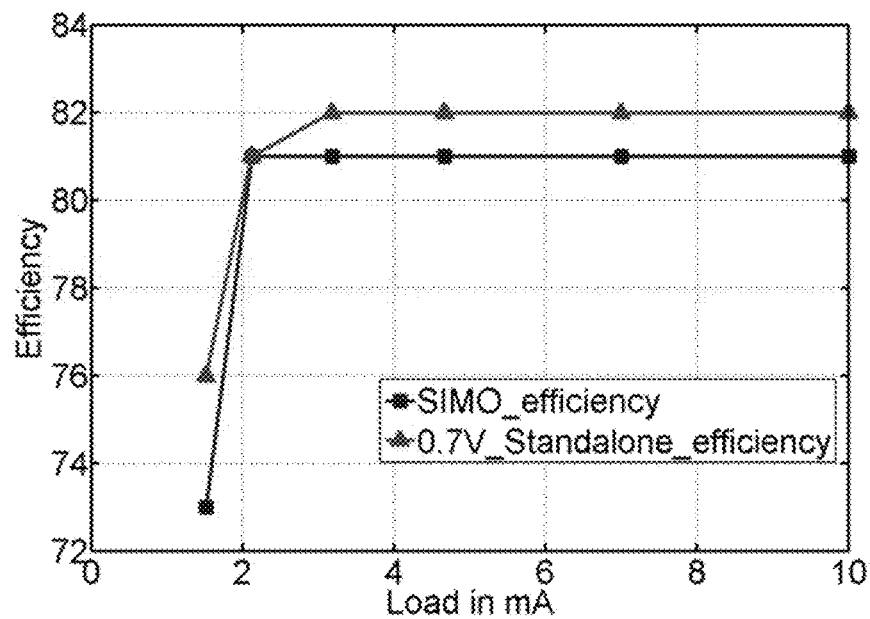
FIG. 23B is an illustrative example of the measured efficiencies of a 0.7 VDC converter circuit, such as can be operated stand-alone, or operated along with other outputs in a multi-output configuration.

FIG. 23B is an illustrative example of the measured efficiencies of a 0.7 VDC converter circuit, such as can be operated stand-alone, or operated along with other outputs in a multi-output configuration, such as can be obtained from the SIMO DC-DC converter circuit 1100 as shown in FIG. 11. In a stand-alone configuration, a peak efficiency of the 0.7V DC output (rail) can be approximately 82%. The efficiency was measured with the load current on the 0.7V DC output (or rail) in the SIMO configuration, where the load on the 0.9V and 0.4V rail was 100 μA.

Figure 23C:
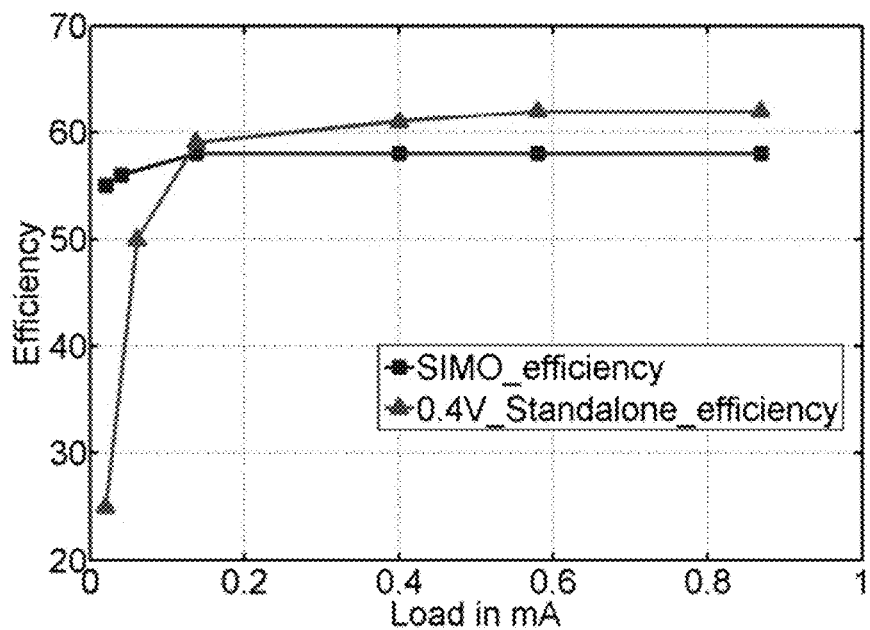
FIG. 23C illustrates generally an illustrative example of the measured efficiencies of a 0.4 VDC converter circuit, such as can be operated stand-alone, or operated along with other outputs in a multi-output configuration.

FIG. 23C illustrates generally an illustrative example of the measured efficiencies of a 0.4 VDC converter circuit, such as can be operated stand-alone, or operated along with other outputs in a multi-output configuration, such as can be obtained from the SIMO DC-DC converter circuit 1100 as shown in FIG. 11. In a stand-alone configuration, a peak efficiency of the 0.4V DC output (rail) can be approximately 61%. The efficiency was measured with the load current on the 0.4V DC output (or rail) in the SIMO configuration, where the load on the 0.9V and 0.7V rail was 100 µA.

Figure 23D:
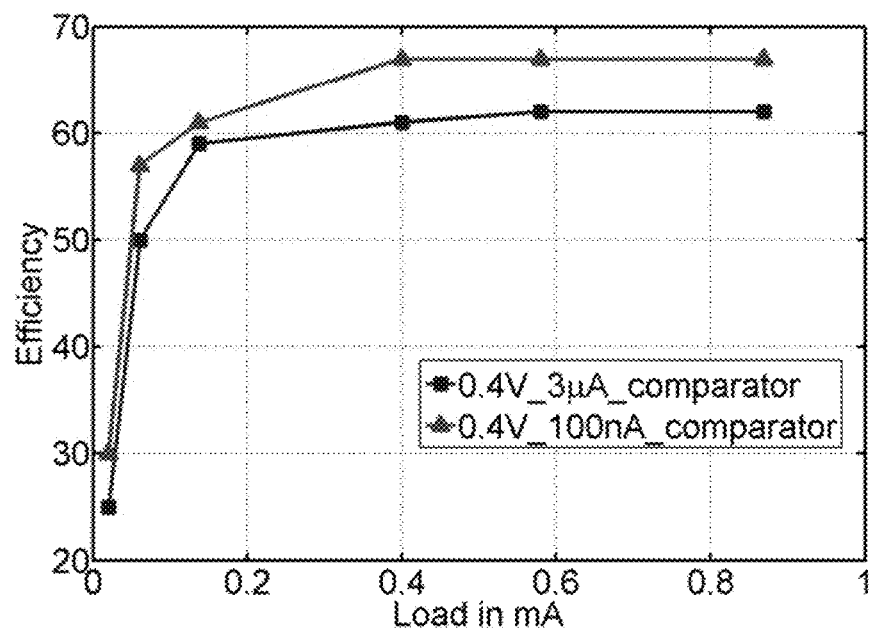
FIG. 23D illustrates generally an illustrative example of the measured efficiencies of a 0.4 VDC converter circuit, such as can be obtained from the SIMO DC-DC converter circuit as shown in FIG. 11, but having a lower-static-current comparator and a higher-static-current comparator.

FIG. 23D illustrates generally an illustrative example of the measured efficiencies of a 0.4V DC converter circuit, such as can be obtained from the SIMO DC-DC converter circuit 1100 as shown in FIG. 11, but having a lower-static-current comparator and a higher-static-current comparator. In the example of FIG. 23D, a peak efficiency of the 0.4V DC converter circuit, using a comparator circuit consuming about 3 µA, can be approximately 68%. A peak efficiency of a 0.4V DC converter circuit, using a comparator circuit consuming about 100 nanoamperes (nA), can be approximately 61%. Hence, the efficiency was measured on the 0.4V DC output (or rail) that was operated in low and high quiescent current mode with the 0.9V and 0.7V rails disabled.

Figure 24:
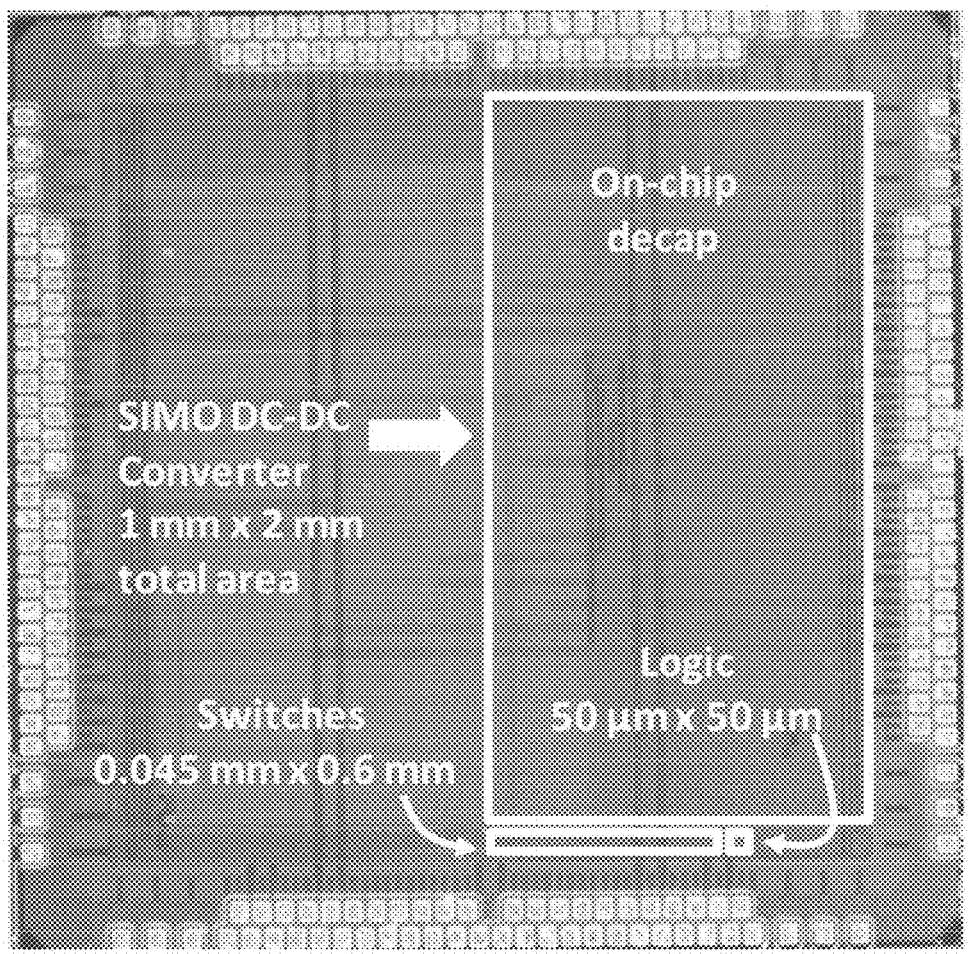
FIG. 24 is an example of a die microphotograph of an integrated circuit that can include at least a portion of the SIMO DC-DC converter circuit as shown in FIG. 11.

FIG. 24 is a die microphotograph of an integrated circuit that can include at least a portion of the SIMO DC-DC converter circuit 1100 as shown in FIG. 11. Such a circuit can include switches and on-chip decoupling capacitors, such as fabricated using a 65 nm CMOS process node. Neglecting an off-chip inductor, a total area of the converter circuit is about 1 mm×2 mm. The capacitors for the design are implemented using NMOS capacitors. The value of the capacitance is 4.3 nF for 0.9V and 0.7V rails and 2.3 nF for 0.4V rail. The capacitances contribute to ~1 µA of standby current because of the gate oxide leakage. The total area of the converter is 2 mm². The area of the control circuits is 0.03 mm².

Figure 25:
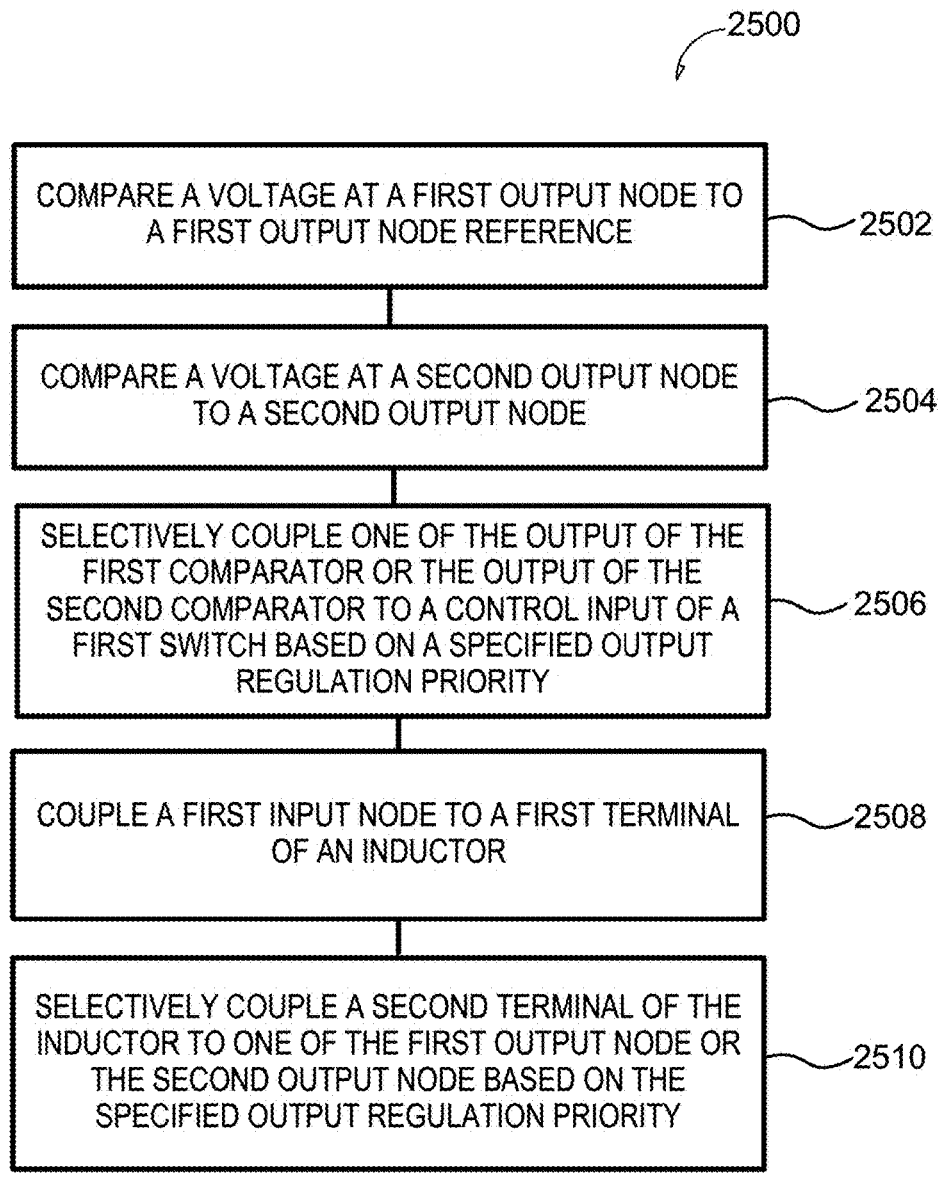
FIG. 25 is a flowchart that illustrates a method for regulating an output voltage using one or more of the converter circuits, according to an embodiment.

FIG. 25 is a flowchart that illustrates a method for regulating an output voltage using one or more of the converter circuits, according to an embodiment. At 2502, a voltage at a first output node can be compared to a first output node reference, such as using a comparator circuit as shown and described in the examples of FIG. 3, 5, 8A, 8B, or 11. Similarly, at 2504, a voltage at a second output node can be compared to a second output node reference, such as using a second comparator circuit. At 2506, one of the output of a first or second comparator can be coupled to a first switch, such as based on a specified output regulation priority.

At 2508, a first input node can be coupled to a first terminal of an inductor, such as using a first switch in response to a signal provided at the control input of the first switch. At 2510, a second terminal of the inductor can be coupled to one of the first output node or the second output node, such as based on the specified output regulation priority. In an example, one or more of the first comparator circuit or the second comparator circuit can include a respective threshold specified at least in part to provide a specified respective hysteresis, such as discussed in relation to the examples of FIG. 8A or 8B and elsewhere.

It is intended that some of the methods and apparatus described herein can be performed by software (stored in memory and executed on hardware), hardware, or a combination thereof. For example, the control software on the cell phone can be performed by such software and/or hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

For example, while many of the embodiments described herein are discussed in the context of a cell phone, other types of mobile communication devices having a commercial radio can be used such as, for example, a smart phone and a tablet with wireless communication capabilities. Similarly, while many of the embodiments described herein are discussed in the context of sending and receiving data packets, any type of data unit may be applicable including data cells and data frames, depending upon the applicable communication standard.

What is claimed is:

1. A method, comprising:
   receiving information related to one or more of a processing power demand and an available energy level of an integrated circuit (IC) that includes a single-inductor multiple-output (SIMO) direct current-direct current (DC-DC) converter circuit and a panoptic dynamic voltage scaling (PDVS) circuit operatively coupled to the SIMO DC-DC converter circuit, the SIMO DC-DC converter circuit having a plurality of output nodes, each output node from the plurality of output nodes being uniquely associated with a supply voltage rail from a plurality of supply voltage rails, and the PDVS circuit having a plurality of operational blocks; and operating the PDVS circuit such that each operational block from the plurality of operational blocks draws power from one supply voltage rail from the plurality of supply voltage rails.

2. The method of claim 1, further comprising:

receiving, at a first comparator of the SIMO DC-DC converter circuit, a first bias current and producing a control signal to select a first output node from the plurality of output nodes when the first output node experiences a first load; and receiving, at a second comparator of the SIMO DC-DC converter circuit, a second bias current and producing a control signal to select the first output node from the plurality of output nodes when the first output node experiences a second load lower than the first load;

the second bias current being less than the first bias current, a power consumption of the second comparator being less than a power consumption of the first comparator when the SIMO DC-DC converter circuit is operative, an efficiency of the SIMO DC-DC converter being higher when the second comparator produces the control signal to select the first output node than when the first comparator produces the control signal to select the first output node, the second comparator configured to be placed in an off mode with a power consumption less than a power consumption of the second comparator during an operative mode, when the first comparator produces the control signal to select the first output node, and the first comparator configured to be placed in an off mode with a power consumption less than a power consumption of the first comparator during an operative mode, when the second comparator produces the control signal to select the first output node.

3. The method of claim 1, wherein the SIMO DC-DC converter circuit and the PDVS circuit are included within an integrated circuit (IC), the method further comprising:

prioritizing within a time period a single output node from the plurality of output nodes of the SIMO DC-DC converter circuit based on which operational blocks from the plurality of operational blocks of the PDVS circuit connect to which supply voltage rails from the plurality of supply voltage rails during the time period.

4. The method of claim 1, further comprising:

receiving, at a first comparator of the SIMO DC-DC converter circuit, a first bias current and producing a control signal for a first output node from the plurality of output nodes; and receiving, at a second comparator of the SIMO DC-DC converter circuit, a second bias current and producing a control signal for a second output node from the plurality of output nodes;

the second bias current being less than the first bias current, an output voltage for the second output node being less than an output voltage for the first output node, a power consumption of the second comparator being less than a power consumption of the first comparator when the SIMO DC-DC converter circuit is operative.

5. The method of claim 1, wherein:

the SIMO DC-DC converter circuit includes a plurality of comparators and a plurality of switches operatively coupled to the plurality of comparators;

each comparator from the plurality of comparators is uniquely associated with a switch from the plurality of switches;

each comparator from the plurality of comparators is uniquely associated with a bias current from a plurality of bias currents, at least one bias current from the plurality of bias currents differing from the remaining bias currents from the plurality of bias currents; and each switch from the plurality of switches is associated with an output node from the plurality of output nodes;

the method further comprising:

collectively sending, from the plurality of comparators, a control signal to control each switch from the plurality of switches such that current is sent to each output node from the plurality of output nodes based on that control signal; and collectively regulating, by the plurality of comparators and the plurality of switches, voltages on each output node from the plurality of output nodes.

6. The method of claim 1, further comprising:

receiving, at each comparator from a plurality of comparators of the SIMO DC-DC converter circuit, a bias current from a plurality of bias currents and a feedback signal from an output node for that comparator and from the plurality of output nodes, at least one bias current from the plurality of bias currents differing from the remaining bias currents from the plurality of bias currents; and collectively selecting, by the plurality of comparators and a plurality of switches operatively coupled to the plurality of comparators, an output node from the plurality of output nodes based on (1) a condition of each output node from the plurality of output nodes, and (2) a relative priority of each output node from the plurality of output nodes.

7. The method of claim 1, wherein:

the SIMO DC-DC converter circuit includes a plurality of comparators and a plurality of switches operatively coupled to the plurality of comparators, each comparator from the plurality of comparators being uniquely associated with a switch from the plurality of switches; and each comparator from the plurality of comparators is associated with a lower hysteresis threshold from a plurality of lower hysteresis thresholds and an upper hysteresis threshold from a plurality of upper hysteresis thresholds;

the method further comprising:

producing, at each comparator from the plurality of comparators, a pulse having a width based on hysteresis thresholds associated with that comparator such that the switch uniquely associated with that comparator is controlled in response to that pulse.

8. The method of claim 1, further comprising:

prioritizing within a time period a single output node from the plurality of output nodes of the SIMO DC-DC converter circuit based on which operational blocks from the plurality of operational blocks of the PDVS circuit connect to which supply voltage rails from the plurality of supply voltage rails during the time period; and limiting, by a plurality of comparators of the SIMO DC-DC converter circuit and a plurality of switches operatively coupled to the plurality of comparators, a ripple of an output voltage within a predefined range for each output node from the plurality of output nodes, the ripple of the output voltage for the single output node being less than a ripple of the output voltage for each remaining output node from the plurality of output nodes.

9. A method, comprising:

collectively limiting, by a plurality of comparators of a single-inductor multiple-output (SIMO) direct current-direct current (DC-DC) converter circuit and a plurality of switches operatively coupled to the plurality of comparators, a ripple of an output voltage within a predefined range for a plurality of output nodes of the SIMO DC-DC converter circuit; and collectively defining, by the plurality of comparators and the plurality of switches, a hysteretic-based voltage output threshold to control the plurality of output nodes,
  each comparator from the plurality of comparators being uniquely associated with an output node from the plurality of output nodes, and
  each output node from the plurality of output nodes being uniquely associated with an operational block from a plurality of operational blocks of a panoptic dynamic voltage scaling (PDVS) circuit.

10. The method of claim 9, further comprising:

receiving, at a first comparator of the plurality of comparators, a first bias current and producing a control signal to select a first output node from the plurality of output nodes when the first output node experiences a first load; and receiving, at a second comparator of the plurality of comparators, a second bias current and producing a control signal to select the first output node from the plurality of output nodes when the first output node experiences a second load lower than the first load;
  the second bias current being less than the first bias current, a power consumption of the second comparator being less than a power consumption of the first comparator when the SIMO DC-DC converter circuit is operative,
  an efficiency of the SIMO DC-DC converter circuit being higher when the second comparator produces the control signal to select the first output node than when the first comparator produces the control the signal to select the first output node,
  the second comparator configured to be placed in an off mode with a power consumption less than a power consumption of the second comparator during an operative mode, when the first comparator produces the control signal to select the first output node, and
  the first comparator configured to be placed in an off mode with a power consumption less than a power consumption of the first comparator during an operative mode, when the second comparator produces the control signal to select the first output node.

11. The method of claim 9, further comprising:

collectively selecting, by the plurality of comparators and the plurality of switches, an output node from the plurality of output nodes based on (1) a condition of each output node from the plurality of output nodes, and (2) a relative priority of each output node from the plurality of output nodes.

12. The method of claim 9, further comprising:

receiving, at each comparator from the plurality of comparators, a bias current from a plurality of bias currents and a feedback signal from an output node for that comparator, at least one bias current from the plurality of bias currents differing from the remaining bias currents from the plurality of bias currents; and collectively selecting, by the plurality of comparators and the plurality of switches, an output node from the plurality of output nodes based on (1) a condition of each output node from the plurality of output nodes, and (2) a relative priority of each output node from the plurality of output nodes.

13. The method of claim 9, wherein:

each comparator from the plurality of comparators is associated with a lower hysteresis threshold from a plurality of lower hysteresis thresholds and an upper hysteresis threshold from a plurality of upper hysteresis thresholds, at least one lower hysteresis threshold differs from the remaining lower hysteresis thresholds from the plurality of lower hysteresis thresholds, and at least one upper hysteresis threshold differs from the remaining upper hysteresis thresholds from the plurality of upper hysteresis thresholds.

14. The method of claim 9, wherein:

the SIMO DC-DC converter circuit and a plurality of capacitors are included within an integrated circuit (IC), each output node from the plurality of output nodes is uniquely associated with a capacitor from the plurality of capacitors, and a size of each capacitor from the plurality of capacitors is less than a size of a capacitor for a SIMO DC-DC converter circuit without hysteretic-based voltage output thresholds.

15. A method, comprising:

operating, at a single-inductor multiple-output (SIMO) direct current-direct current (DC-DC) converter circuit, over a plurality of time periods, the SIMO DC-DC converter circuit having a plurality of output nodes and an inductor; and prioritizing a single output node from the plurality of output nodes for each time period from the plurality of time periods such that that single output node receives current from the inductor before the remaining output nodes from the plurality of output nodes.

16. The method of claim 15, further comprising:

receiving, at a first comparator of a plurality of comparators of the SIMO DC-DC converter circuit, a first bias current and producing a control signal to select a first output node from the plurality of output nodes when the first output node experiences a first load associated with a panoptic dynamic voltage sealing (PDVS) circuit that includes a plurality of operational blocks, each operational block from the plurality of operational blocks being coupled to the plurality of output nodes; and receiving, at a second comparator of the plurality of comparators, a second bias current and producing a control signal to select the first output node from the plurality of output nodes when the first output node experiences a second load associated with the PDVS circuit lower than the first load;

placing the second comparator in an off mode with a power consumption less than a power consumption of the second comparator during an operative mode, when the first comparator produces the control signal to select the first output node; and placing the first comparator in an off mode with a power consumption less than a power consumption of the first comparator during an operative mode, when the second comparator produces the control signal to select the first output node;

the second bias current being less than the first bias current, a power consumption of the second comparator being less than a power consumption of the first comparator when the SIMO DC-DC converter circuit is operative, and an efficiency of the SIMO DC-DC converter circuit being higher when the second comparator produces the control signal to select the first output node than when the first comparator produces the control signal to select the first output node.

17. The method of claim 15, wherein:

the single output node is a first single output node, the SIMO converter circuit and a plurality of operational blocks are included within an integrated circuit (IC), each operational block from the plurality of operational blocks being coupled to the plurality of output nodes;

the method further comprising:

activating a second single output node from the plurality of output nodes of the SIMO DC-DC converter circuit within a time period such that the operational block uniquely associated with that second single output node is activated to regulate within the IC for that time period.

18. The method of claim 15, further comprising:

collectively selecting, by a plurality of comparators of the SIMO DC-DC converter circuit and a plurality of switches operatively coupled to the plurality of comparators, an output node from the plurality of output nodes based on a current of a load operatively coupled to a plurality of operational blocks, each operational block from the plurality of operational blocks being coupled to the plurality of output nodes.

19. The method of claim 15, further comprising:

limiting, by a plurality of comparators of the SIMO DC-DC converter circuit and a plurality of switches operatively coupled to the plurality of comparators, a ripple of an output voltage for the plurality of output nodes within a predefined range.

* * * * *

UNITED STATES PATENT AND TRADEMARK OFFICE
CERTIFICATE OF CORRECTION

PATENT NO. : 10,170,990 B2
APPLICATION NO. : 15/640745
DATED : January 1, 2019
INVENTOR(S) : Benton H. Calhoun and Aatmesh Shrivastava It is certified that error appears in the above-identified patent and that said Letters Patent is hereby corrected as shown below:

In the Specification

Column 1, Line 17 after "CROSS-REFERENCE TO RELATED PATENT APPLICATION" paragraph, please add:
--STATEMENT OF GOVERNMENTAL SUPPORT
This invention was made with government support under UV01 a subcontract of W91CRB-10-C-0106 awarded by the Defense Advanced Research Projects Agency. The government has certain rights in the invention.--

Signed and Sealed this
Twenty-second Day of December, 2020

Andrei Iancu
*Director of the United States Patent and Trademark Office*